United States Patent
Rajapakse et al.

(10) Patent No.: US 7,358,856 B2
(45) Date of Patent: Apr. 15, 2008

(54) TWO-PHASE COMMIT SYNCHRONIZING SEAL STATE

(75) Inventors: Ravindra U. Rajapakse, San Francisco, CA (US); Leo Shang-Hua Chang, San Carlos, CA (US); Joseph Siufai Chan, Milpitas, CA (US); Jeyappragash Jeyakeerthi, Santa Clara, CA (US); Andrew Edward Savige Alcock, Singapore (SG)

(73) Assignee: Savi Technology, Inc., Sunnyvale, CA (US)

( * ) Notice: Subject to any disclaimer, the term of this patent is extended or adjusted under 35 U.S.C. 154(b) by 307 days.

(21) Appl. No.: 11/084,126

(22) Filed: Mar. 17, 2005

(65) Prior Publication Data

US 2006/0202825 A1 Sep. 14, 2006

Related U.S. Application Data

(63) Continuation-in-part of application No. 11/009,691, filed on Dec. 9, 2004, and a continuation-in-part of application No. 11/010,188, filed on Dec. 9, 2004.

(60) Provisional application No. 60/554,710, filed on Mar. 18, 2004.

(51) Int. Cl.
*G08B 13/14* (2006.01)

(52) U.S. Cl. ............... 340/572.1; 340/568.2; 340/539.17

(58) Field of Classification Search ............ 340/572.1, 340/572.7, 572.8, 568.1, 568.2, 686.1, 686.2, 340/539.22, 539.26, 539.17
See application file for complete search history.

(56) References Cited

U.S. PATENT DOCUMENTS

| | | | |
|---|---|---|---|
| 4,688,244 A | 8/1987 | Hannon et al. | |
| 4,750,197 A | 6/1988 | Denekamp et al. | |
| 5,565,858 A | 10/1996 | Guthrie | |
| 5,835,012 A | 11/1998 | Wilk | |
| 5,841,365 A | 11/1998 | Rimkus | |
| 5,892,441 A | 4/1999 | Woolley et al. | |
| 5,959,568 A | 9/1999 | Woolley | |
| 6,002,343 A * | 12/1999 | Auerbach et al. | 340/10.41 |
| 6,148,291 A | 11/2000 | Radican | |
| 6,211,781 B1 | 4/2001 | McDonald | |
| 6,662,068 B1 * | 12/2003 | Ghaffari | 700/115 |
| 6,714,121 B1 | 3/2004 | Moore | |

(Continued)

OTHER PUBLICATIONS

Notification Of The International Search Report Or The Declaration and Written Opinion Of The International Searching Authority, PCT/US04/14208, Apr. 28, 2995, 9 pages.

(Continued)

*Primary Examiner*—Benjamin C. Lee
(74) *Attorney, Agent, or Firm*—Fenwick & West LLP

(57) ABSTRACT

A conveyance tracking system provides two-phase transaction commit processing for synchronizing seal state information between a seal device attached to a conveyance and a host for tracking conveyances. The system uses a reader device for synchronization and communication between the seal device and host system regarding various operations, such as a lock operation, an unlock operation, and a clear tamper operation. In the first phase of the two-phase commit, the seal device prepares for the operation and the host executes the operation. In the second phase, the seal device fulfills the irreversible operation, ensuring that the seal state of the seal device and host are in sync.

50 Claims, 16 Drawing Sheets

U.S. PATENT DOCUMENTS

| | | | |
|---|---|---|---|
| 6,753,775 B2 * | 6/2004 | Auerbach et al. | 340/539.22 |
| 6,804,578 B1 | 10/2004 | Ghaffari | |
| 6,820,805 B2 | 11/2004 | Stevens | |
| 6,879,257 B2 * | 4/2005 | Hisano et al. | 340/568.2 |
| 6,888,241 B1 * | 5/2005 | Korn et al. | 257/728 |
| 6,927,687 B2 | 8/2005 | Carrender | |
| 6,943,678 B2 | 9/2005 | Muirhead | |
| 6,972,682 B2 | 12/2005 | Lareau et al. | |
| 6,973,385 B2 * | 12/2005 | Ulrich | 701/207 |
| 7,005,985 B1 | 2/2006 | Steeves | |
| 7,042,354 B2 * | 5/2006 | Auerbach et al. | 340/539.31 |
| 7,075,412 B1 | 7/2006 | Reynolds et al. | |
| 7,075,441 B2 * | 7/2006 | Tsukamoto | 340/572.8 |
| 7,194,438 B2 * | 3/2007 | Sovio et al. | 705/50 |
| 2001/0018672 A1 | 8/2001 | Petters et al. | |
| 2002/0029178 A1 | 3/2002 | Wiederin et al. | |
| 2003/0011474 A1 * | 1/2003 | Ng | 340/568.1 |
| 2003/0125980 A1 | 7/2003 | Ribeiro | |
| 2003/0227382 A1 | 12/2003 | Breed | |
| 2004/0100379 A1 * | 5/2004 | Boman et al. | 340/539.26 |
| 2004/0153344 A1 | 8/2004 | Bui et al. | |
| 2004/0177032 A1 | 9/2004 | Bradley et al. | |
| 2005/0109845 A1 | 5/2005 | Ghaffari | |
| 2005/0110636 A1 * | 5/2005 | Ghaffari | 340/539.27 |
| 2005/0231365 A1 * | 10/2005 | Tester et al. | 340/568.1 |
| 2005/0237184 A1 | 10/2005 | Muirhead | |
| 2005/0241548 A1 | 11/2005 | Muirhead | |
| 2005/0288937 A1 | 12/2005 | Verdiramo | |
| 2006/0152366 A1 * | 7/2006 | Sironi et al. | 340/572.1 |
| 2007/0164857 A1 * | 7/2007 | Odenwald et al. | 340/539.22 |

OTHER PUBLICATIONS

Notification of Transmittal of the International Search Report and the Written Opinion of the International Searching Authority, or the Declaration, PCT Application No. PCT/US04/15166, Sep. 6, 2005, 6 pages.

International Search Report and the Written Opinion, PCT/US04/41501, Nov. 3, 2005, 11 pages.

Notification of Transmittal of the International Search Report and the Written Opinion, PCT/US04/14192, Jan. 18, 2006, 8 pages.

"Guidance from AIM Global's RFID Expert Group: Proposed Guidelines for the Use of RFID-Enabled Labels in Military Logistics: Recommendations for Revision of MIL-STD-129," AIM Global, May 13, 2005, 39 pages.

"RFID Product Requirements for the Savi Total Asset Visibility Portable Deployment Kit," 2004, Savi Technology, Inc., 25 pages, 2004.

"The Intermec® Guide to RFID Reader Selection," Intermec Technologies Corporation, 2004, 6 pages.

Notification of the International Search Report and Written Opinion, PCT/US04/11086, Sep. 5, 2006, 10 pages.

"RFID Overview: Introduction to Radio Frequency Identification," Intermec Technologies Corporation, 1999, pp. 1-7.

"Supply Chain RFID: How it Works and Why It Pays," Intermec Technologies Corporation, 2004, pp. 1-12.

PCT International Search Report and Written Opinion, PCT/US04/41767, Mar. 13, 2007, 25 pages.

Notice of Preliminary Rejection, Korean Application No. 10-2006-7013827, Jul. 31, 2007, 12 pages.

* cited by examiner

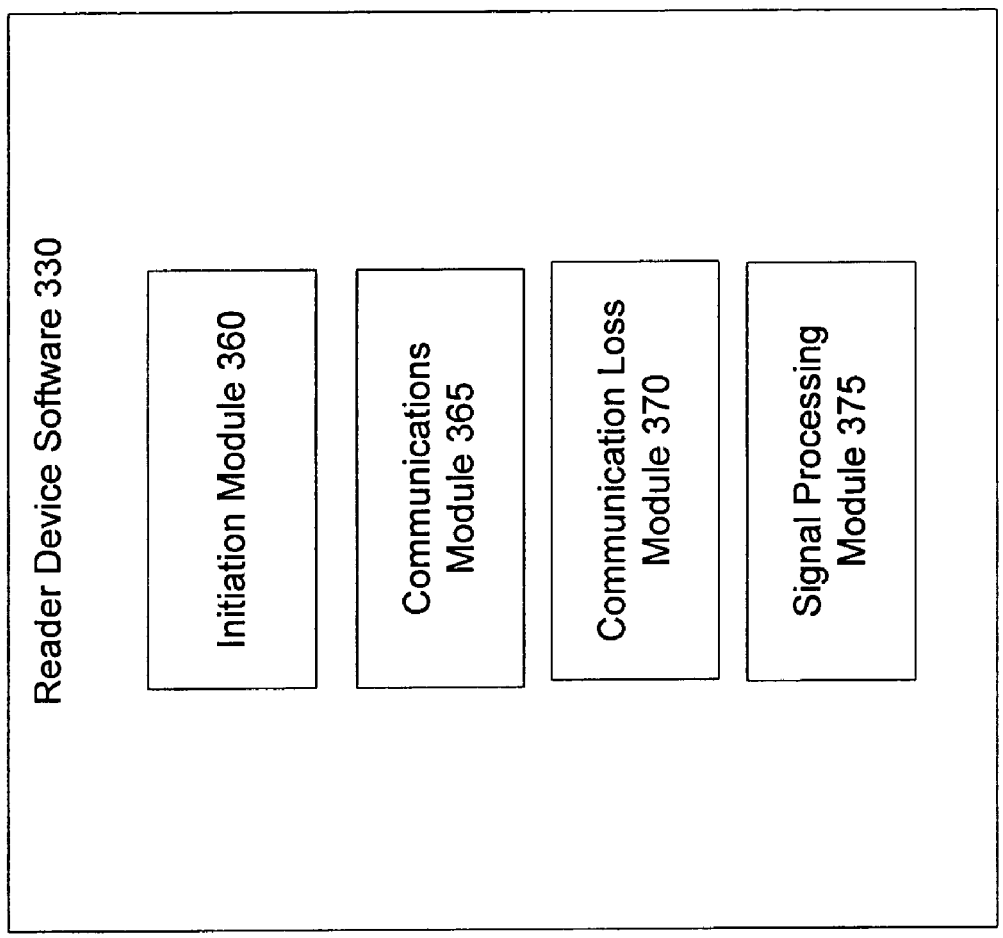

TWO-PHASE COMMIT SYNCHRONIZING SEAL STATE

RELATED APPLICATIONS

This application: claims priority under 35 U.S.C. § 119(e) to U.S. patent application Ser. No. 60/554,710, filed on Mar. 18, 2004, entitled "Synchronizing Tag State," by Ravindra Rajapakse et al.; claims priority under 35 U.S.C. § 120 as a continuation-in-part of U.S. patent application Ser. No. 11/009,691, filed on Dec. 9, 2004, entitled "Dual Mode Reader Device," by Stephen Lambright et al.; and claims priority under 35 U.S.C. § 120 as a continuation-in-part of U.S. patent application Ser. No. 11/010,188, filed on Dec. 9, 2004, entitled "Item Level Visibility of Nested and Adjacent Containers," by Stephen Lambright et al.

FIELD OF THE INVENTION

This invention relates generally to two-phase commit processing and, more specifically, to two-phase commit processing for synchronizing state information between entities.

BACKGROUND OF THE INVENTION

In radio frequency identification (RFID) systems involving container security, an RFID seal is electronically locked to secure a container, conveyance, or other item whose security state is to be monitored by a host system. For accurate knowledge of the security state, the state of the seal must always be synchronized with the state as stored by the host system. However, situations may arise in which simple seal device read or write commands can result in a loss of synchronization; and restoration of synchronization in these situations can be difficult. In addition, if a host needs to execute a series of read and write requests as a transaction, requiring either atomicity or isolation from transactions with other hosts, basic read/write seal operations are inadequate.

One solution is the use of two-phase commit processing. In traditional two-phase commit processes, changes required by a transaction initially are temporarily stored by each entity involved in the process. The first phase is a pre-commit, in which each entity prepares for the transaction. Upon acknowledgement by each entity, the second phase is a commit, in which all entities make the transaction changes permanent. This process enables entities to be returned to the pre-transaction state if an error occurs, a process known as rollback. This ensures that all entities are updated or none at all.

However, some security state situations involve the use of irreversible seal operations. Certain seal operations may be used that change the internal state of the seal in a way that is not undoable; these are known as irreversible seal operations. For example, in the context of security state updates, seal states cannot be rolled back once locked because of security implications. After locking, a seal key is generated, and the seal state is irreversible.

In addition, some situations may arise in which multiple hosts and readers can be in contact with a seal device. For example, if a process requires a first host to both read and write data to the same location, e.g., a seal device, and a second host executes the read step after the first host has read the seal but before it has written to it, the second host may make its decision on what to write for its write step incorrectly, since it has read "stale" data. Another example exists when a host needs to write data to a series of seal memory locations and have all of the writes executed atomically or not at all.

Note that these problems may occur even in the absence of multiple hosts with the potential of communicating to the same seal device. With the presence of multiple hosts talking to the same tag, these problems are exacerbated. In these situations, conventional two-state phase commit processing for synchronization, in which data may be rolled back, cannot be used.

SUMMARY OF THE INVENTION

The present invention provides a system and method for two-phase transaction commit processing in a conveyance tracking system. The system comprises a seal device, a reader device, and a host system. The system and method use the reader device for synchronizing seal state information between the seal device, which is attached to a conveyance, and a host configured for tracking conveyances.

Using the method, the reader device instructs the seal device to prepare for an operation. In the first phase of the two-phase commit, the reader device instructs the seal device to prepare and send information to the host system. The reader device acts as an intermediary for information exchanged between the seal device and host system. The host system updates stored seal state information and sends confirmation back to the seal device via the reader device. Then, in the second phase of the two-phase commit, the reader device instructs the seal to commit, and the seal device fulfills the irreversible operation. This process ensures that the physical seal state of the seal device is identical to the seal state as stored by the host system. These seal states are said to be "in sync." Several types of operations can be used in this process, including a lock operation, an unlock operation, and a clear tamper operation.

It is not possible to "undo" the event log records generated in the seal device or to rollback the transaction. However, the system provides for updates in the event of communication breakdown between the entities. For example, if the host system were to send a message to lock to a seal device, and subsequent communication to the seal device failed, the seal device would not be synchronized with the host. However, the reader device can detect such breaches in communication. For example, following the above-described interruption in the communication with the seal device, the reader device updates the seal device once communication is reestablished. Likewise, if a problem occurs at the host system end, the reader device sends an abort message to the seal device to prevent fulfilling the operation for which the seal device has prepared.

The process of irreversible logging of events enables a system, working in conjunction with the hardware entities, to provide vastly increased security against tampered containers. For example, if in an attempt to breach the security of the container, assume someone who knows the RF protocol or has stolen an access device cuts a bolt of a seal device, clears the tamper record, installs a new bolt, and re-locks the seal device. The seal device may appear to be locked and un-tampered, however, the system can still determine that suspicious activity has occurred, since the log records of the seal device and host system will be out of sync. Thus, the use of these protocols and commands will enhance system performance and efficiency.

BRIEF DESCRIPTION OF THE FIGURES

FIG. 3C is a block diagram showing reader device software according to one embodiment of the present invention.

Figure 1:
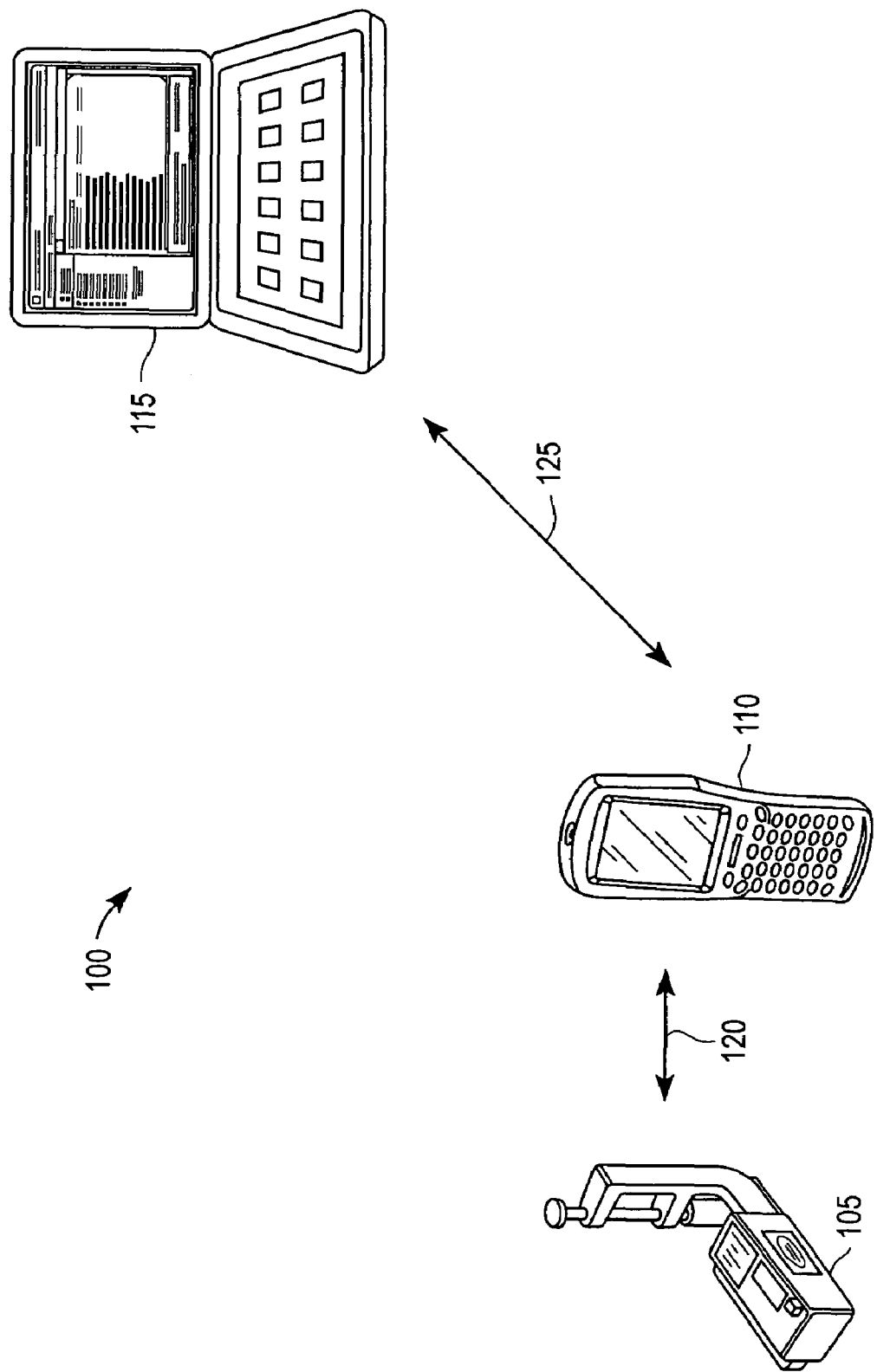
FIG. 1 is a schematic diagram showing a transaction processing system 100 according to one embodiment of the present invention.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTIONS OF THE PREFERRED EMBODIMENTS

The present invention provides for two-phase transaction commit processing in a conveyance tracking system 100. The system 100 comprises a seal device 105, a reader device 110, and a host system 115. The system 100 and method use the reader device 110 for synchronizing seal state information between the seal device 105, which attached to a conveyance, and a host 115 configured for tracking conveyances.

A system and method for two-phase transaction commit processing in a conveyance tracking system are disclosed. The system 100 according to some embodiments of the present invention is set forth in FIGS. 1-4B, and methods operating therein, according to some embodiments of the present invention, are set forth in FIGS. 5A-5E.

The accompanying description is for the purpose of providing a thorough explanation with numerous specific details. Of course, the field of cargo tracking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

The processes, features, or functions of the present invention can be implemented by program instructions that execute in an appropriate computing device. Example computing devices include electronic tags, enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripting code FIG. 1 is a schematic diagram showing a transaction processing system 100 according to one embodiment of the present invention. The transaction processing system 100 uses a two-phase commit processing strategy to synchronize seal states as described in conjunction with FIGS. 5A-E. The transaction processing system 100 includes a seal device 105, a reader device 110, and a host system 115.

The seal device 105 is a radio frequency identification (RFID) device coupled, attached, or otherwise integrated with a container or conveyance to detect security breaches in the container or conveyance, as described in conjunction with FIGS. 2A-2E. The seal device 105 communicates with the reader device 110 via communication channel 120 to prepare for and fulfill irreversible seal operations. In one embodiment, communication channel 120 carries ultra high frequency (UHF) signals between the seal device 105 and the reader device 110.

The reader device 110 serves as an intermediary between the seal device 105 and the host system 115, as described below in conjunction with FIGS. 3A-3C. The reader device 110 is configured to communicate with seal devices 105 and with the host system 115. The reader device 110 communicates with the host system 115 via communication channel 125. In one embodiment, communication channel 125 carries communications using IEEE standard 802.11 protocol.

Figure 4A:
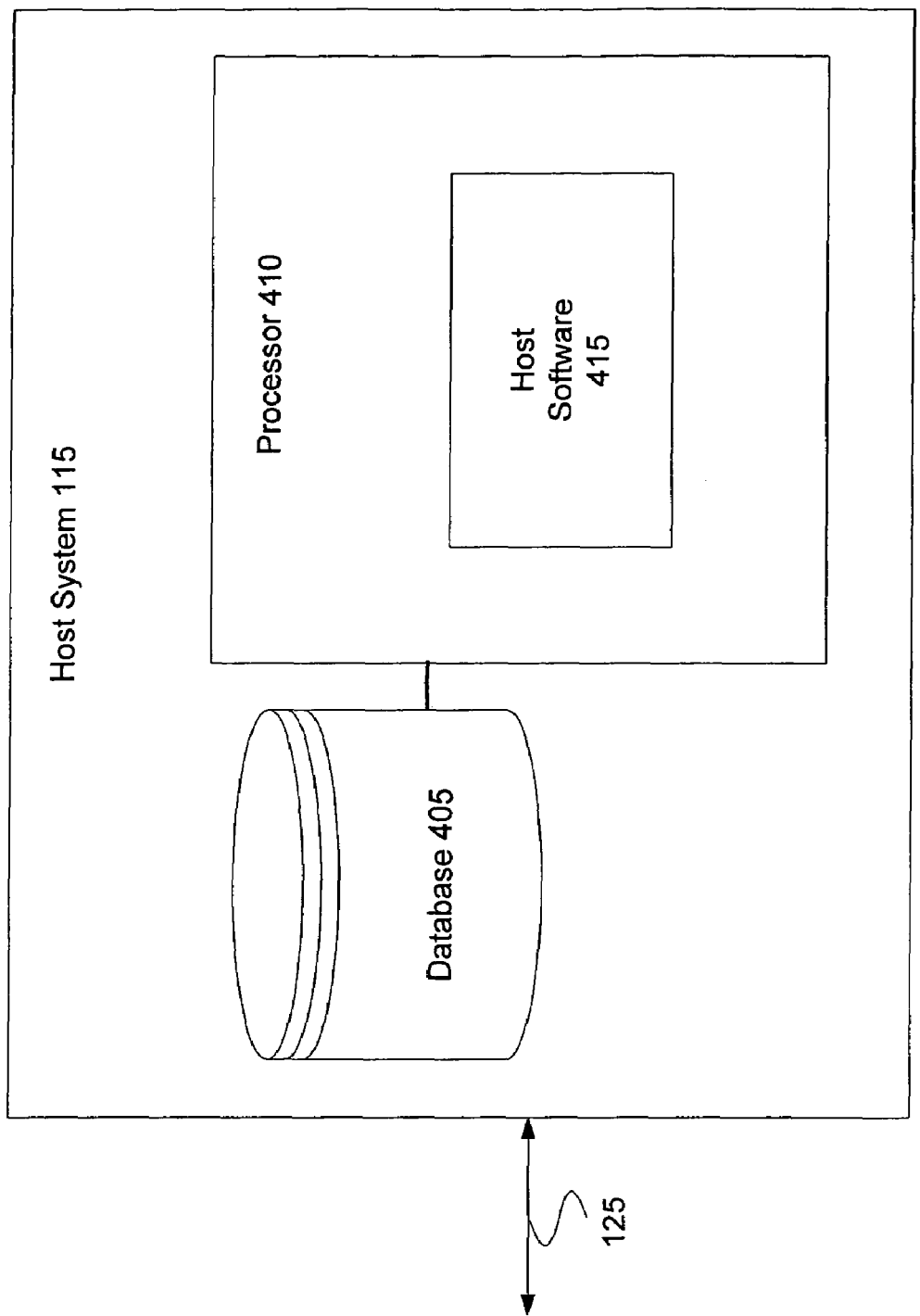
FIG. 4A is a block diagram showing a host system according to one embodiment of the present invention.
Figure 4B:
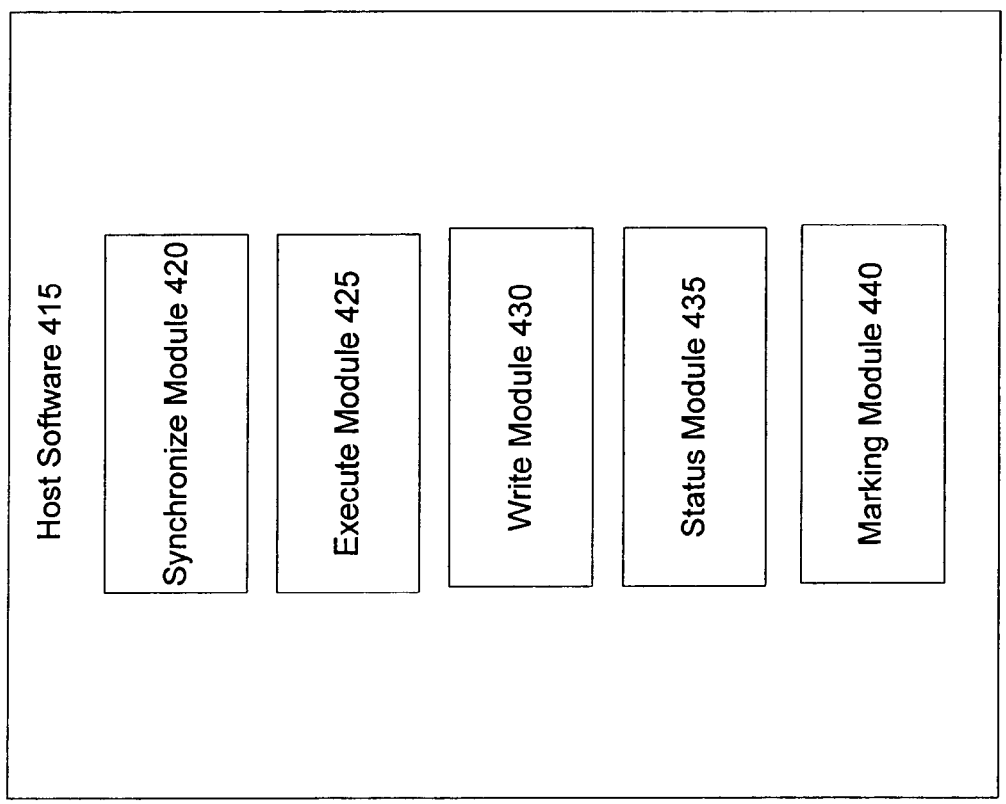
FIG. 4B is a block diagram showing host system software according to one embodiment of the present invention.

The host system 115 is a remote transportation security system for tracking conveyances, as described in conjunction with FIGS. 4A-4B. The host system 115 communicates with the reader device 110 via communication channel 125 to execute and store data about irreversible seal operations. The transaction processing system 100 may include additional entities along communication channel 125, such as a site server and/or business engine (not shown).

The process of irreversible logging of events enables the system 100, working in conjunction with the hardware entities, to provide vastly increased security against tampered containers, enhancing system performance and efficiency.

Figure 2A:
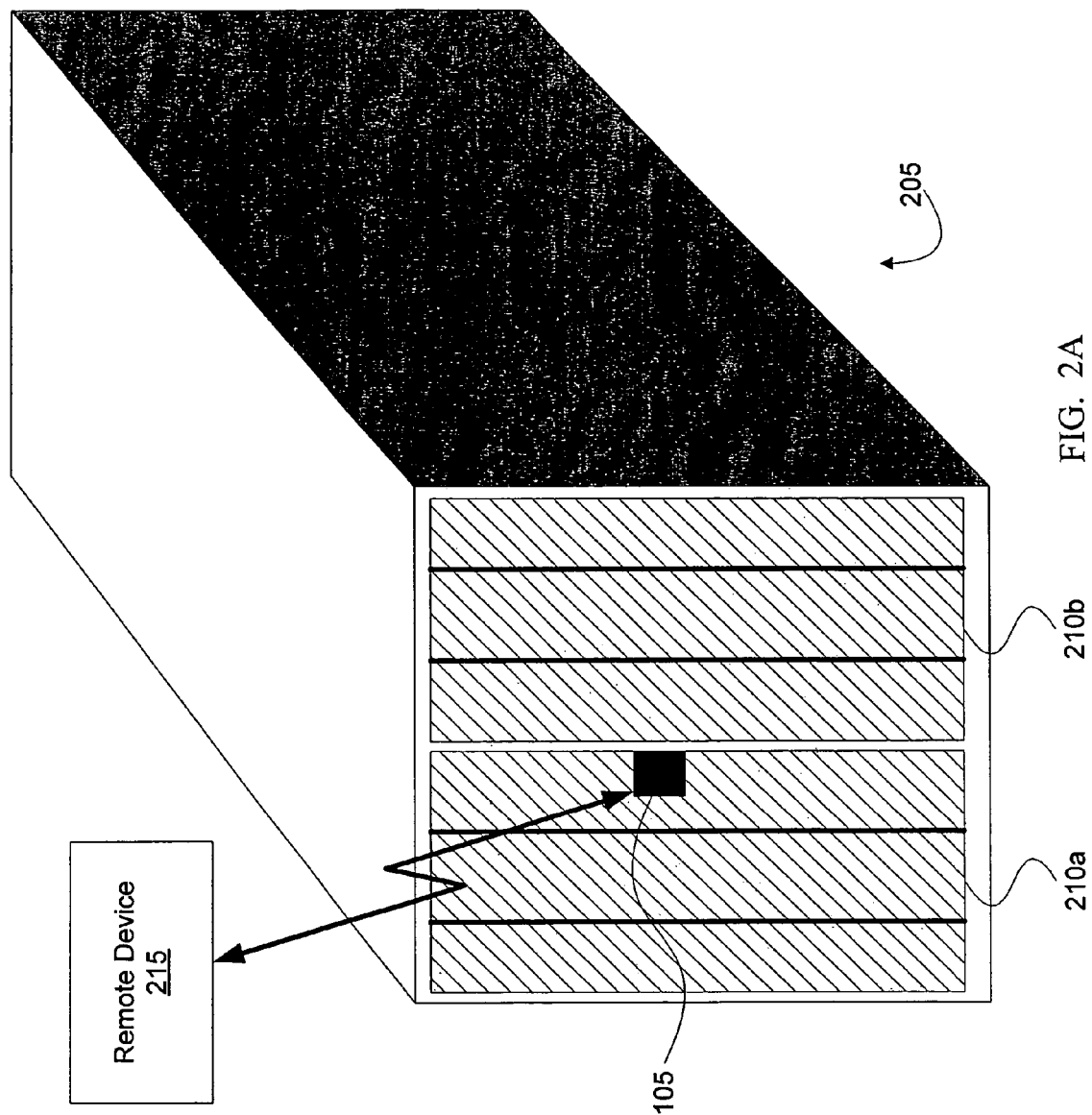
FIG. 2A is a schematic diagram illustrating an example container with seal device according to one embodiment of the present invention.

FIG. 2A is a schematic diagram illustrating an example container 205 with seal device 105 according to one embodiment of the present invention. The container 205 stores several smaller containers, cargo, packages or goods. The container 205 includes doors 210a-b and seal device 105. In one embodiment, the container 205 has slidable vertical bars attached to keep the doors 210a-b closed. Note that the container 205 is merely an example as it can vary in size, shape, and configuration (e.g., more than two doors).

Figure 2B:
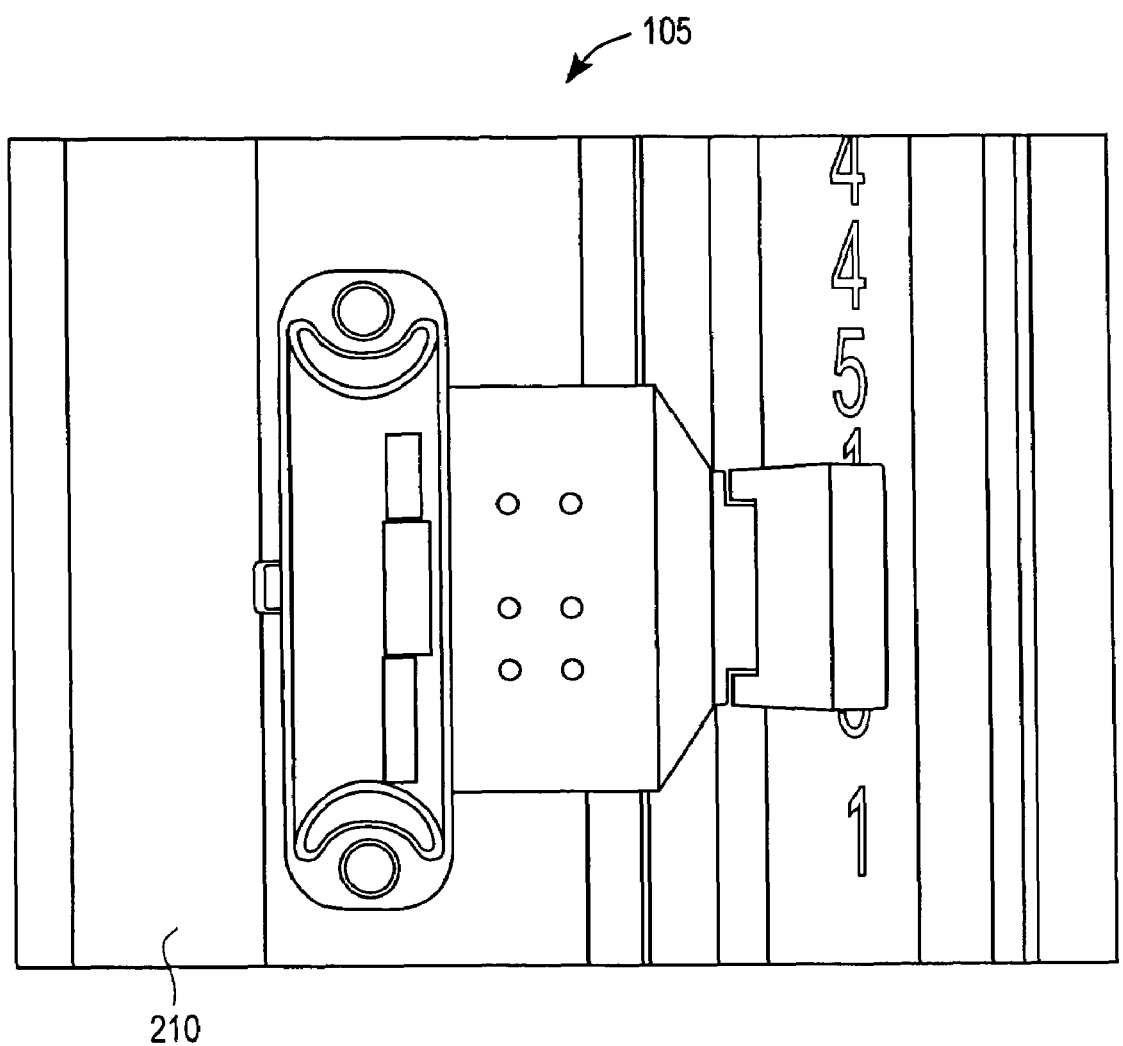
FIGS. 2B and 2C are illustrations of seal devices according to various embodiments of the present invention.
Figure 2C:
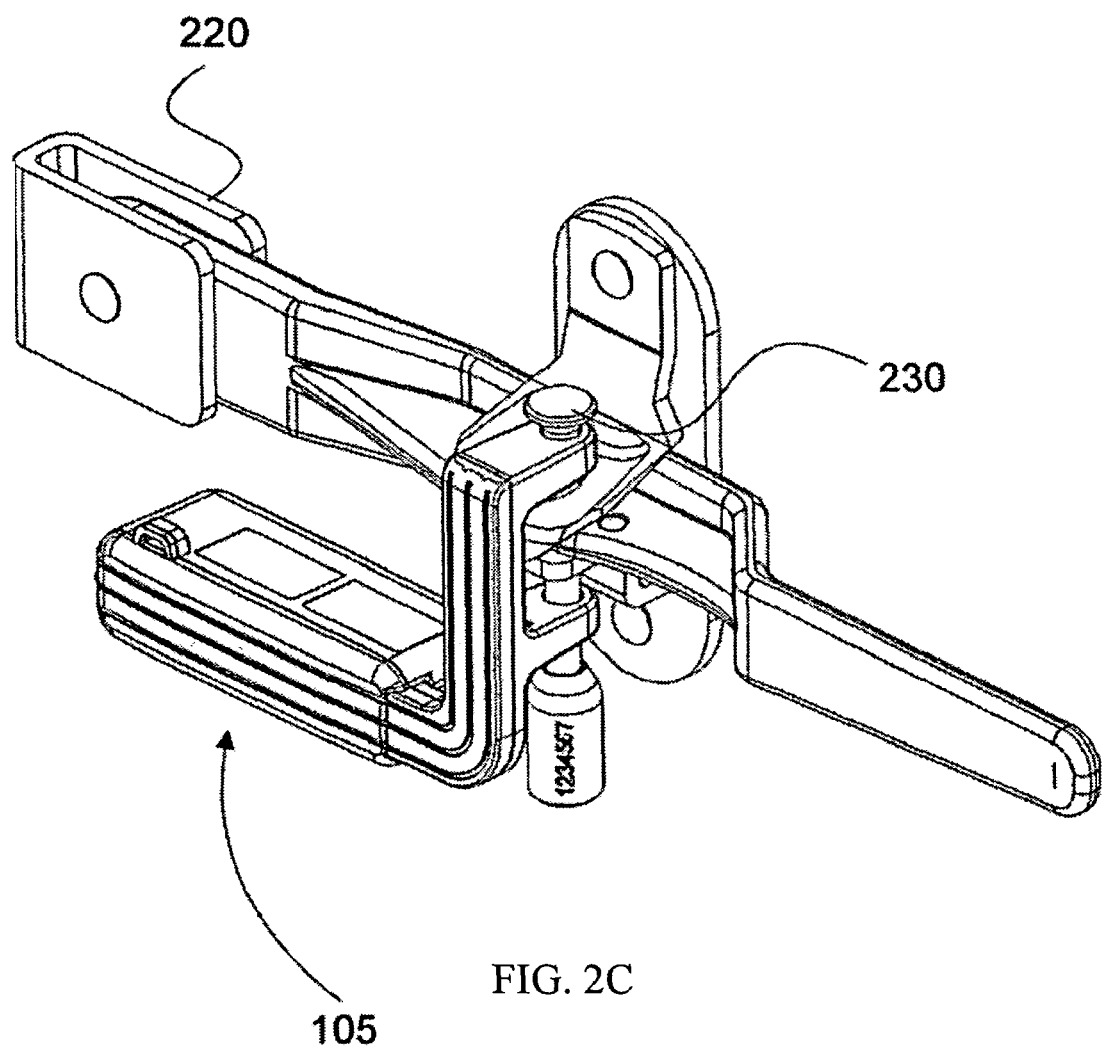

FIGS. 2B and 2C are illustrations of seal devices 105 according to various embodiments of the present invention. FIG. 2B shows a seal device 105 attached to a door 210. FIG. 2C shows a seal device attached to a container hasp 220. In either of the depicted embodiments, the seal device 105 is coupled, attached or otherwise integrated with the container 205 in a position to detect security breaches, for example suing a sensor 225 as described in conjunction with FIG. 2D. When one of the doors 210a-b is opened or when there is an attempt to open one of the doors 210a-b, the sensor 225 detects the attempt. For example, in FIG. 2C a bolt 230 goes through both the seal device 105 and the hasp 220. The seal device 105 detects whether the bolt 230 is present to determine whether the container is open or closed. In one embodiment, the detecting seal device 105 sends a signal indicating a security breach to a remote device 215, such as a reader device 110 or a site manager (not shown). In another embodiment, a remote device 215 can periodically poll the seal device 105 for information.

If the sensor 225 detects that a door has been opened while the seal 105 is in a "lock" state, the seal 105 puts itself into a "tamper" state. The "tamper" state can result only from this activity; there is no command to put the seal 105 into a "tamper" state. The use of a "tamper" state is important because when the conveyance arrives at its destination, the recipient can easily determine which containers have been sealed for the entire route and which indicate a "tamper" and thus warrant further inspection. If the sensor 225 detects that a door has been opened while the seal 105 is in an "unlock" state, the state does not change.

In one embodiment (not shown), the seal device 105 physically prevents the door 210 from being opened once set to a "lock" state. In another embodiment (not shown), the seal device 105 is a spring loaded switch.

Figure 2D:
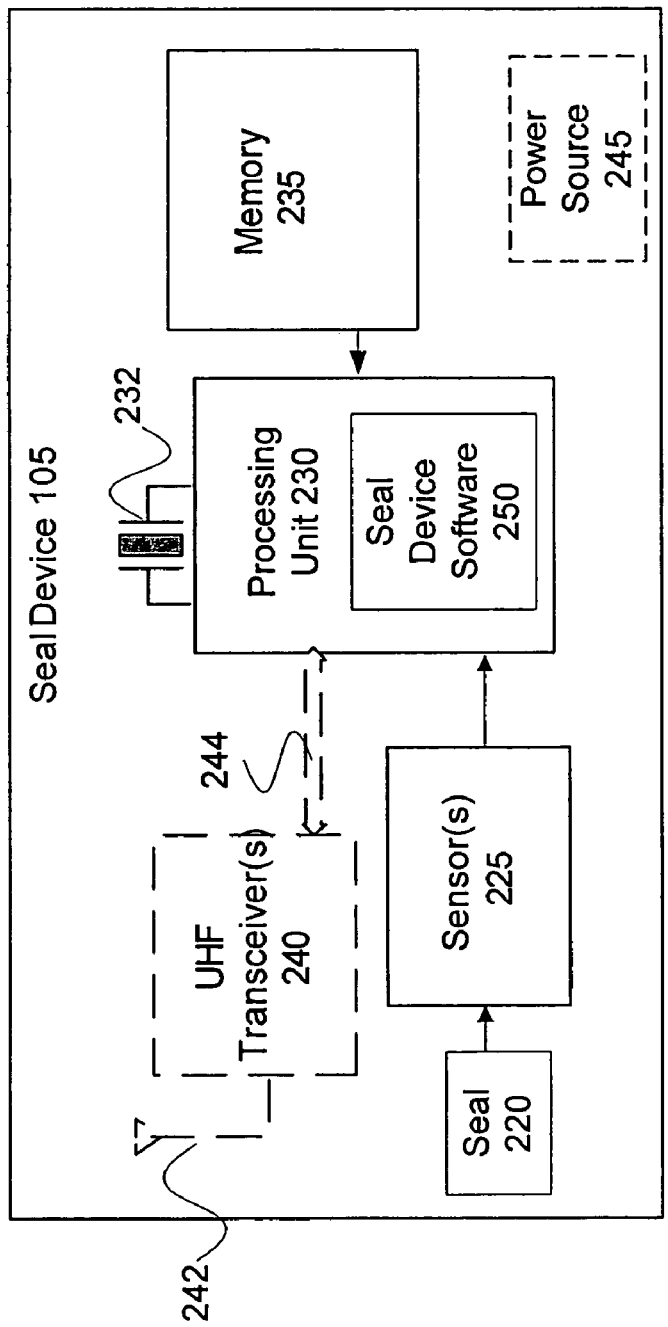
FIG. 2D is a block diagram block illustrating a seal device according to one embodiment of the present invention.

FIG. 2D is a block diagram block illustrating a seal device 105 according to one embodiment of the present invention. The seal device 105 can be a passive or an active radio frequency identification (RFID) device. The basic structure of the seal device 105 includes a seal 220, one or more sensors 225, a processing unit 230, a memory 235, and in some embodiments, one or more Ultra High Frequency (UHF) transceivers 240 and a power source such as a battery 245.

The seal device 105 includes a seal 220, which is an external aspect of the deal device 105 attached to a container or conveyance, for example on a door, e.g., 210. In conjunction with the sensor(s) 225, the seal 220 monitors container security and environmental status as described below. The seal 220 is coupled to the sensor(s) 225.

The seal device 105 includes one or more sensors 225 to detect security breaches and/or environmental conditions associated with the container 205. Security breaches include, but are not limited to, a door open, an attempt to open a door, right door open, left door open, both doors open, and more than one door open. Environmental conditions include, but are not limited to, temperature, humidity, vibration, shock, light, and radiation. In one embodiment, there is one sensor 225 associated with each seal 220 for monitoring security breaches and one or more additional sensors 225 for monitoring environmental conditions.

The processing unit 230 comprises, for example, a CPU (central processing unit), a mobile CPU, a controller, or other device to execute instructions. In one embodiment, the processing unit 230 contains seal device software 250 as described in conjunction with FIG. 2E. Clocking and synchronization for the processing unit 230 are provided by an oscillator 232. The processing unit 230 is communicatively coupled to the sensor(s) 225, the memory 235, and the UHF transceiver(s) 240, if any.

The memory 235 can be any volatile or non-volatile device capable of storing program instructions and/or data. In one embodiment, the memory 235 stores seal identification, authorization, and control information (e.g., seal status, seal event log, etc.). The memory 235 is coupled to the processing unit 230.

In embodiments in which the seal device 105 is a passive RFID device, the seal device 105 gets its power from the signal sent by the reader device 110. In embodiments in which the seal device 105 is an active RFID device, the seal device 105 also includes one or more transceivers 240 and a power source 245.

The UHF transceiver(s) 240 comprises physical, logical, analog and/or digital communication channels necessary to, for example, send and receive identification information, layer information, and the like to and from RFID devices and RFID readers. The signals transmit and receive through an antenna 242 and a data interface 244 connects the UHF transceiver 240 to the processing unit 230. In some embodiments, there may be more than one UHF transceiver 240, for example separate transceivers for communications with active RFID devices and with passive RFID devices.

The power source 245, for example a battery, provides a source of direct current (DC) voltage to the seal device 105. In some embodiments, the power source 245 may be externally connected to the seal device 245.

In one embodiment, the seal device 105 is a battery assisted passive RFID device. In this example, the seal device transmitter 240 gets its power from the signal sent by the reader device 110, as a passive RFID device would. However, the processor 230 on the battery assisted seal device 105 is powered by a power source, such as a battery (e.g., 245). This configuration allows for less drain on the battery than an active device, but allows for enough power to provide greater processor 230 and memory 235 functionality.

The configuration of the seal device 105 as described above in FIG. 2D is only an example, and can modified according to desired capabilities.

Figure 2E:
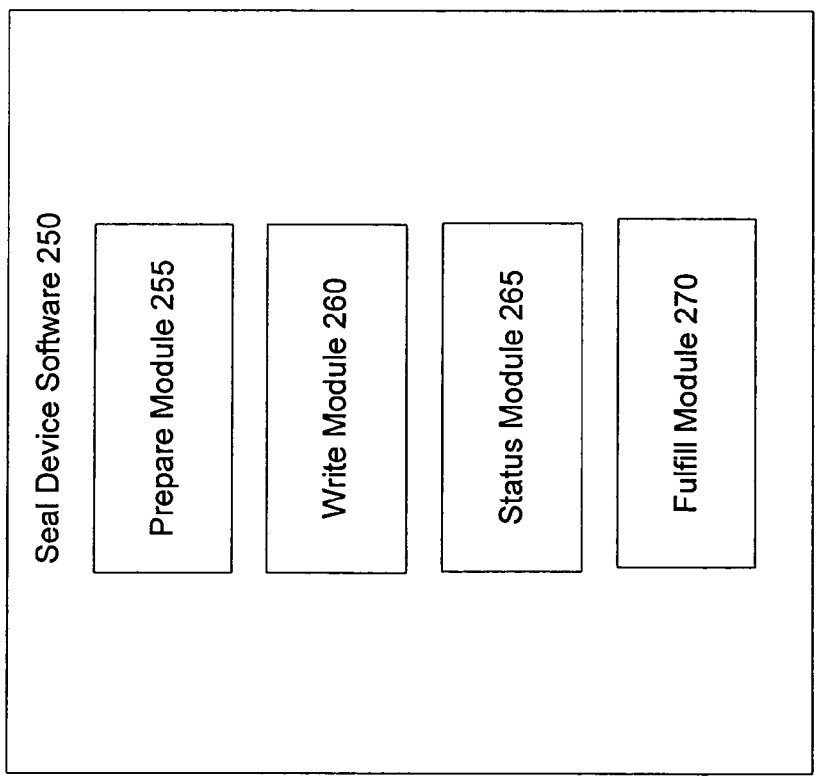
FIG. 2E is a block diagram showing seal device software according to one embodiment of the present invention.

FIG. 2E is a block diagram showing seal device software 250 according to one embodiment of the present invention. The seal device software 250 is responsible for orchestrating the processes performed by the seal device 105 according to the methods of the present invention. The seal device software 250 includes a prepare module 255, a write module 260, a status module 265, and a fulfill module 270.

The prepare module 255 enables the seal device 105 to enter into prepared mode following receipt of a prepare operation message from the reader device 110 and for maintaining this status until a fulfill operation message is received. The write module 260 writes and maintains operation, event, and seal state information in the event log in the memory 235 of the seal device 105. For example, upon preparing for an operation, the write module 260 writes a prepare operation event to the log. Likewise, when the seal device 105 fulfills the operation, the write module 260 writes a fulfill operation event to the log. The status module 265 creates and transmits operation prepare status messages to the reader device 110 based upon the contents of the event log. The fulfill module 270 receives fulfill operation messages from the reader device 110 and enables the seal device 105 to fulfill the operation for which it has prepared. In some situations, this fulfillment step involves committing the irreversible operation. In others, the fulfillment step involves aborting the operation. In one embodiment, the fulfill module 270 places the seal into a "tamper" state in response to receiving from a sensor 225 an indication that a door has been opened while the seal 105 was in a "locked" state.

The above software portions 255-270 need not be discrete software modules. The software configuration shown is meant only by way of example; other configurations are contemplated by and within the scope of the present invention.

Figure 3A:
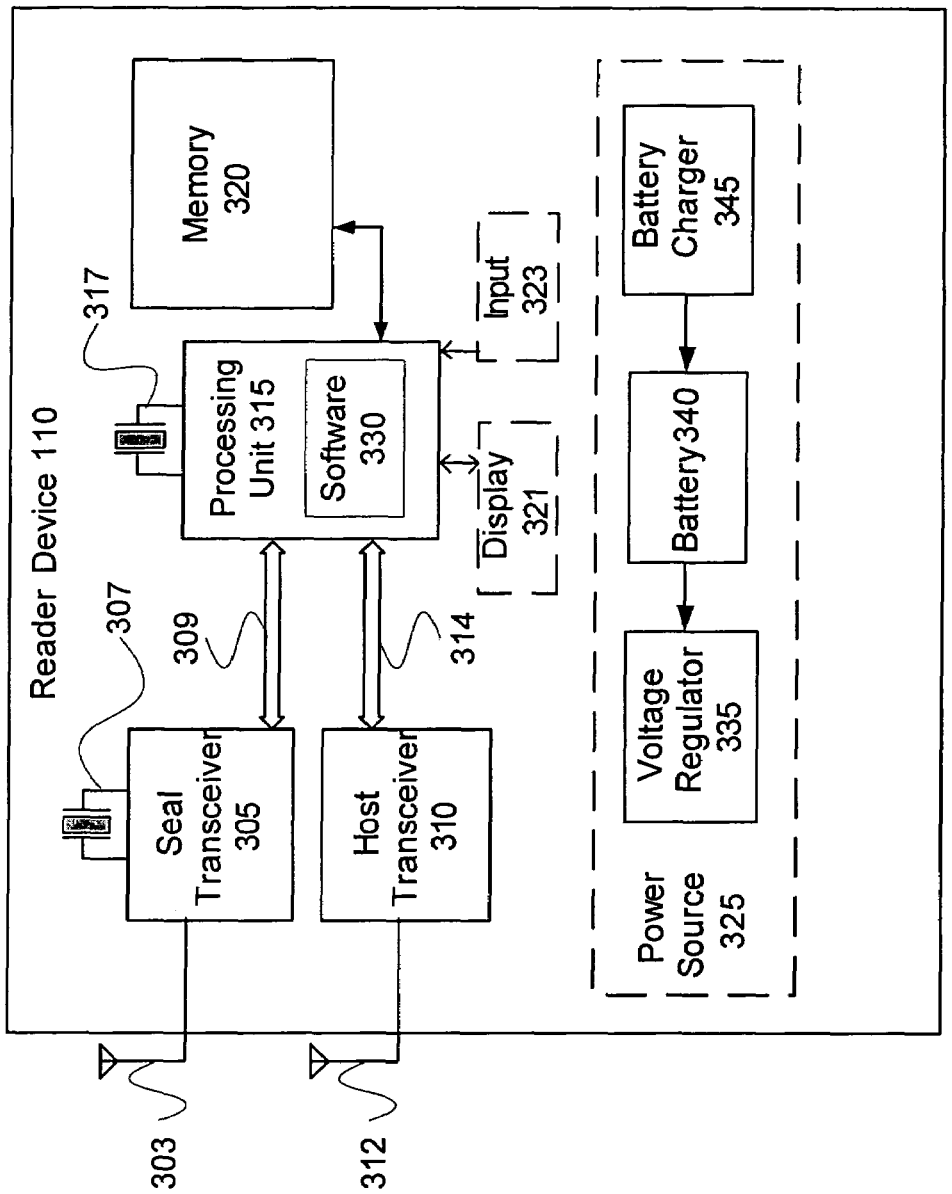
FIG. 3A shows a block diagram of a reader device according to one embodiment of the present invention.
Figure 3B:
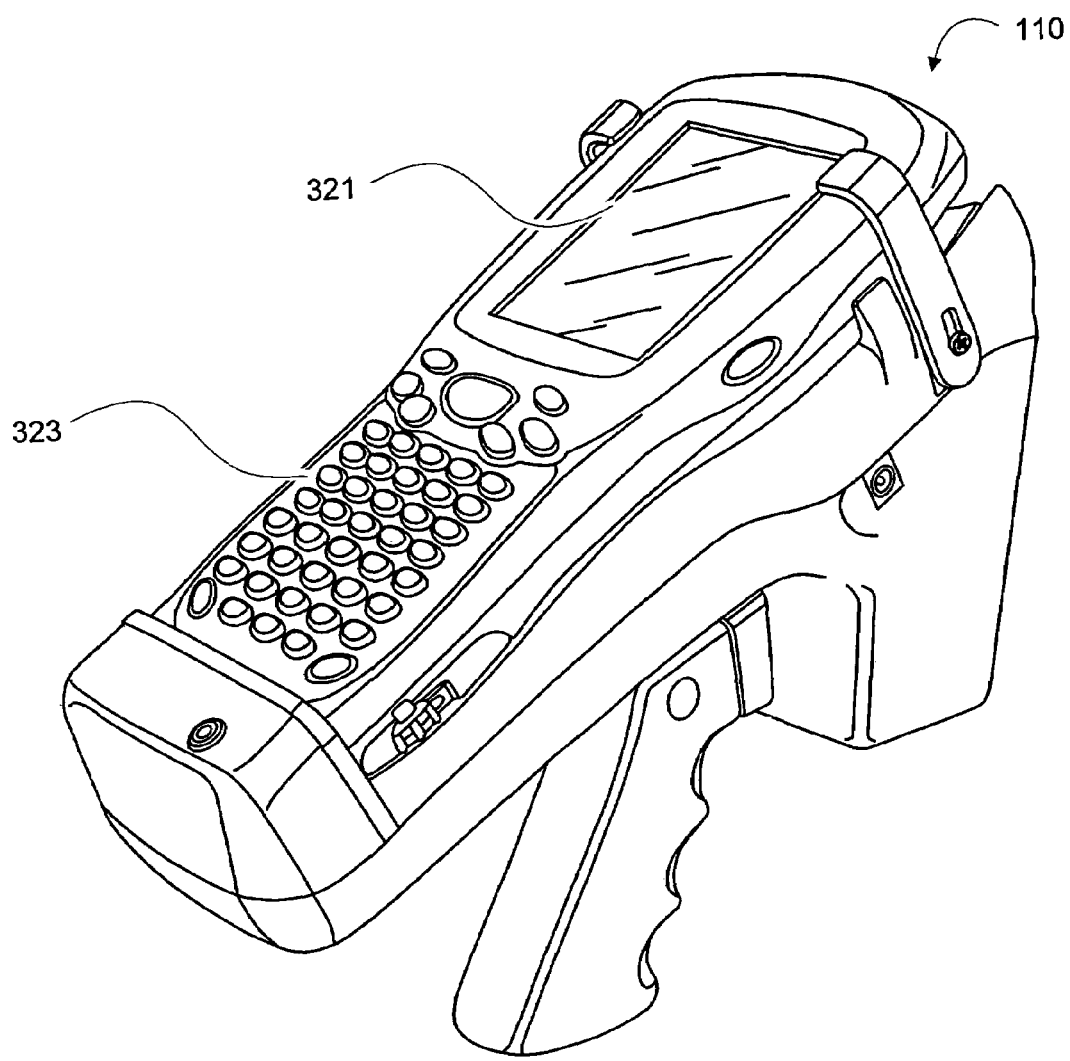
FIG. 3B shows a perspective view of a handheld reader device according to one embodiment of the present invention.

FIG. 3A shows a block diagram of a reader device 110 according to one embodiment of the present invention. The reader device 110 is configured to read to and from RFID devices, e.g., seal device 105. In addition, the reader device 110 can communicate with a host system 115. In one embodiment, the reader device 110 is optimized for use as a handheld device, as depicted in FIG. 3B. In another embodiment, the reader device 110 is stationary. The reader device 110 comprises a seal transceiver 305, a host transceiver 310, a processing unit 315, a memory 320, and in some embodiments a display 321, an input 323, and a power source 325.

The seal transceiver 305 comprises, physical, logical, analog and/or digital communication channels necessary to, for example, send and receive identification information, security information, operation messages, and the like to and from seal device 105 via an antenna 303. The first UHF Transceiver (active) 710 may be available from various vendors. In one embodiment, the seal transceiver 305 transmits and receives signals of 433 MHz. In other embodiments, e seal transceiver 305 transmits and receives signals of 900 MHz or 2.4 GHz. An oscillator 309 controls clocking and synchronization and a data interface 309 connects the seal transceiver 305 to the processing unit 315.

The host transceiver 310 comprises physical, logical, analog and/or digital communication channels necessary to, for example, send and receive identification operation messages and the like to and from a host system 115 via an antenna 312. In one embodiment, the host transceiver 310 transmits and receives signals of 900 MHz using 802.11 series wireless protocol. In other embodiments, the host transceiver 310 transmits and receives signals of 2.4 GHz or 5.8 GHz. A data interface 314 connects the host transceiver 310 to the processing unit 315.

Processing unit 315 comprises, for example, a CPU (central processing unit), a mobile CPU, a controller, or other device to execute instructions. In one embodiment, the processing unit 315 contains software 330 as described in conjunction with FIG. 3C. An oscillator 317 controls clocking and synchronization of the processing unit 315.

In the embodiment shown, the processing unit 315 is capable of processing signals to and from both the seal transceiver 305 and the host transceiver 310. In another embodiment (not shown), the processing unit 315 comprises two separate units, one processor for processing signals to and from the seal transceiver 305 and one processor processing signals to and from the host transceiver 310. In this embodiment, the processors are communicatively coupled.

The processing unit 315 also is communicatively coupled to the memory 320. The memory 320 can be any volatile or non-volatile device capable of storing program instructions and/or data.

The display 321, if any, provides visual information to the user of the reader device 110 regarding the functioning of the reader device 110 and or any input received. The display 321 is communicatively coupled to the processing unit 315. One embodiment of a display 321 is shown in FIG. 3B. The input 323, if any, allows the user of the reader device 110 to input commands to the reader device 110, for example, to initiate an operation as described in conjunction with FIGS. 5A-E. The input 323 is communicatively coupled to the processing unit 315. One embodiment of an input 323 is shown in FIG. 3B.

The power source 325, if present, powers the reader device 110. The power source 325 includes a battery 540 as a source of current, a battery charger 345, and a voltage regulator 335. In an alternative embodiment, the power source 325 is externally connected to or is separate from the reader device 115.

FIG. 3C is a block diagram showing reader device software 330 according to one embodiment of the present invention. The reader device software 330 is software controlled by the processing unit 315, and is responsible for initiating operations and orchestrating communication between the seal device 105 and host system 115 according to the methods of the present invention. The reader device software 330 includes an initiation module 360, a communications module 365, a communication loss module 370, and a signal processing module 375.

The initiation module 360 is responsible for initiating operations. In one embodiment, the initiation module 360 initiates an operation by creating a prepare operation message to be sent to the seal device 105. The communications module 365 is responsible for initiating transmission and reception of messages to and from the seal device 105 and the host system 115. In one embodiment, the messages include prepare operation messages, prepare operation status messages, initiate operation messages, operation status messages, fulfill operation messages, and fulfill failure messages. In addition, the communications module 365 includes software for initiating signals to interrogate seal devices 105.

The communication loss module 370 is responsible for detecting a loss of communication between the various entities of the system 100 and preparing messages to notify the host system 115 of such failures. The signal processing module 375 comprises software for processing all signals sent to and received from seal devices 105. In one embodiment, the processing includes associating signals from one seal device 105 with signals from another seal device 105. The above software portions 360-375 need not be discrete software modules. The configuration shown is meant only by way of example; other configurations are contemplated by and within the scope of the present invention.

FIG. 4A is a block diagram showing a host system 115 according to one embodiment of the present invention. The host system 115 is a remote transportation security system for tracking conveyances. The host system 115 includes a database 405 and a processor 410, and connects to the reader device 110 via communication channel 125.

The database 405 can be any volatile or non-volatile memory device capable of storing program instructions and/or data. The database 405 is communicatively coupled to the processor 410. In one embodiment, the database 405 includes an event log (e.g., 515 of FIGS. 5A-E) that stores control information such as seal status and operation status information. In one embodiment, the database 405 includes a storage device and database software running on a computer.

The processor 410 comprises, for example, a CPU (central processing unit), a mobile CPU, a controller, or other device to execute instructions. In one embodiment, the processor 410 includes host software 415 as described in conjunction with FIG. 4B.

FIG. 4B is a block diagram showing host system software 415 according to one embodiment of the present invention. The host system software 415 is software controlled by the processor 410 and is responsible for orchestrating the processes performed by the host system 115 according to the methods of the present invention. The host system software 415 comprises a synchronization module 420, an execute module 425, a write module 430, a status module 435, and a marking module 440.

The synchronization module 420 in responsible for synchronizing the seal state as stored in the host event log in the database 405 with the physical seal state of the seal device 105. The synchronization process includes, in one embodiment, verification of the authorization of the seal device 105. In one embodiment, the synchronization module 420 performs the synchronization and authorization verification in response to receiving an initiate operation message from the reader device 110, which message includes seal event log, authorization, and seal state information.

The execute module 425 is responsible for executing operations corresponding to respective the initiate operation messages. The execution step changes the seal state as stored by the host 115 to reflect the goal of the operation. For example, for a lock operation, the seal state would change to locked.

The write module 430 writes and maintains operation, event, and seal state information in the host event log in the database 405. For example, after execution of an operation, the write module 430 writes an operation complete event to the log.

The status module 435 creates and transmits operation status messages to the reader device 110 based upon the contents of the host event log. In one embodiment, the status module 435 allows the host 115 to infer that an operation has been successfully fulfilled by the seal device 105.

The marking module 440 works in conjunction with the synchronization module 420. If a discrepancy between the seal state as stored by the host 115 and the physical seal state of the seal device 105 is detected during synchronization, the marking module 440 is responsible for marking as suspect the asset or conveyance associated with the seal device 105.

The above software portions 420-440 need not be discrete software modules. The configuration shown is meant only by way of example; other configurations are contemplated by and within the scope of the present invention.

Figure 5A:
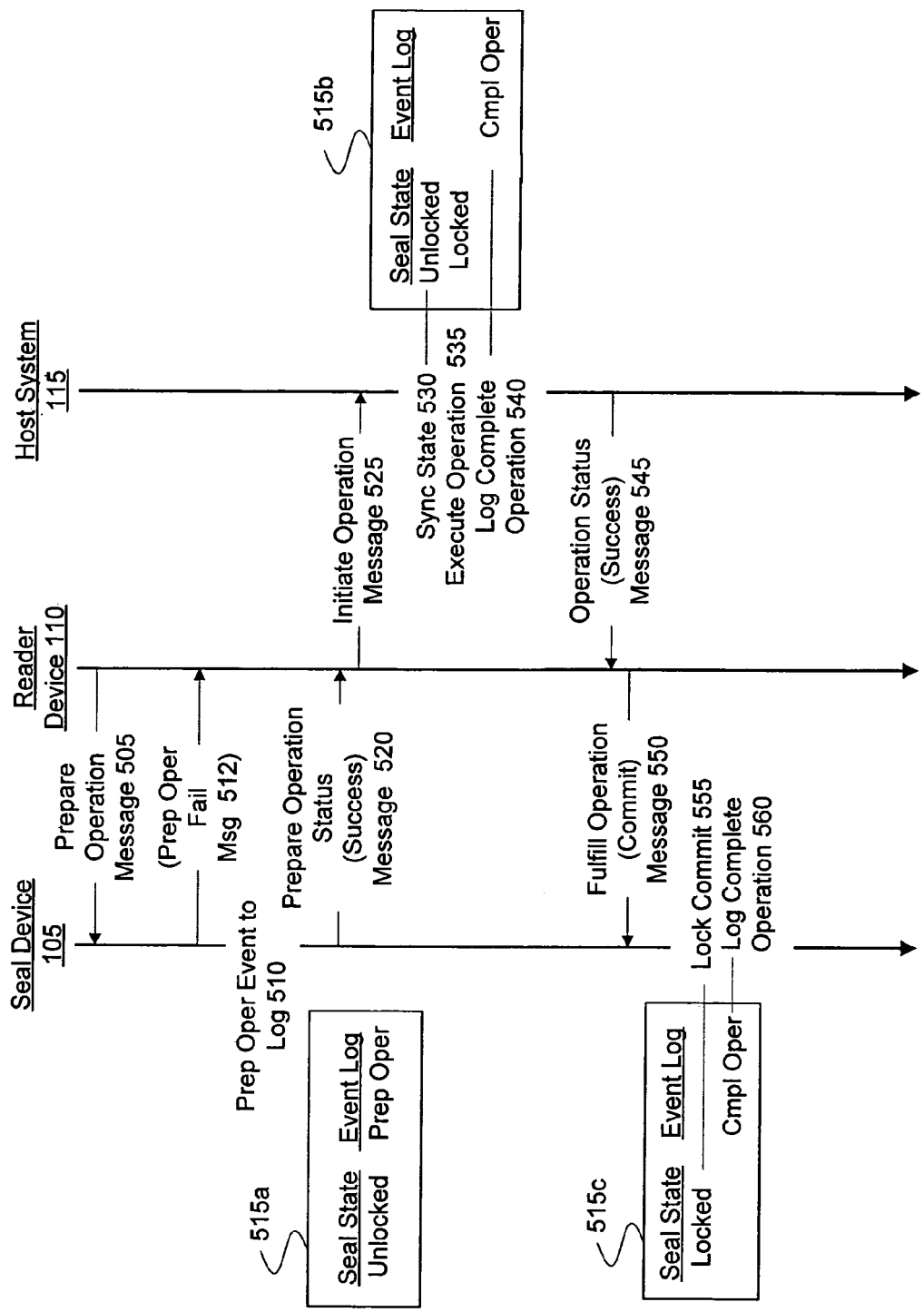
FIG. 5A is an interaction diagram illustrating a successful two-phase commit process for a completed seal operation according to one embodiment of the present invention.

FIG. 5A is an interaction diagram illustrating a successful two-phase commit process for a completed seal operation according to one embodiment of the present invention. Initially, a reader device 110 informs a seal device 105 that an operation is to be executed. The term operation, as used herein, refers to various actions that may take effect at the seal device 105, such as lock, unlock, or clear tamper. In one embodiment, the operation is irreversible.

The reader device 110 informs the seal device 105 of the operation that is to take place by, in response to receiving user input to initiate the operation, transmitting 505 a prepare operation message to the seal device 105. For example, if the operation to be performed is a lock operation, the prepare operation message would be a PrepareLock operation. Upon receiving the prepare operation message, the seal device 105 writes 510 a prepare operation event to an event log 515. An event log 515 includes seal state information and a record of events that take place at the seal device 105. An example of the contents of a seal device event log 515*a* for a lock operation at this point in the process is shown in event log 515*a*: seal state unlocked and event log prepare operation (prep oper). Once logged, the seal device 105 transmits 520 a prepare operation status message to the reader device 110. In this example, the status is successful. If for some reason the seal device 105 failed to receive the prepare operation message or write the prepare operation event to the log 515*a*, the prepare operation status message would be a prepare operation fail message 512 (dotted line).

In response to receiving the (successful) prepare operation status message, the reader device 110 transmits 525 an initiate operation message to a host 115 ("host" herein). If the reader device 110 had instead received a failed prepare operation status message 112, the reader device 110 would not initiate the operation. Alternatively, if communication between the seal device 105 and the reader device 110 failed during transmission of the prepare operation status message 520, the reader device 110 would be unaware that the message was sent, and also would not initiate the operation. In that case, the process would restart at some point after a predetermined timeout period. In one embodiment, the initiate operation message includes various information about the seal device 105, such as authorization information, event log data, and current seal state for the seal device. The host 115 then synchronizes 530 the seal state in its event log 515*b*, which usually is stored in a host database 405, with the seal state information received with the initiate operation message. As part of the synchronization process, the host 115 also may verify the authorization information received. An example of the contents of a host event log 515*b* at this point is shown in event log 515*b* aligned with synch step 530: seal state unlocked.

Next, the host 115 executes 535 the operation corresponding to the initiate operation message, in this example a lock operation. In this example the operation was successful and the seal state is now locked. An example of an unsuccessful operation will be described in conjunction with FIG. 5B. Then, the host 115 writes 540 a complete operation event to the event log 515*b*. An example of the contents of a host event log 515*b* at this point is shown in event log 515*b* aligned with the log 540 step: seal state locked and complete operation (cmpl oper).

When the event is complete and logged, the host 115 then transmits 545 an operation status message to the reader device 110, in this example a success message. In response to receiving the operation status message, the reader device 110 in turn transmits 550 a fulfill operation message to the seal device 105. The effect of the host 115 transmitting 545 an operation status message but the reader device 110 never receiving it is described in conjunction with FIG. 5E. In the example depicted in FIG. 5A, the fulfill operation message is a commit operation message, as the operation execution was successful at the host 115 and the operation status message was a success message. The commit operation message instructs the seal device 105 to commit the operation for which it has prepared. The effect of the fulfill operation message being transmitted 550 by the reader device 110 but never received by the seal device 105 is described in conjunction with FIGS. 5C and 5D. In response to receiving the commit operation message, the seal device 105 commits 555 the lock operation and writes 560 the complete operation (cmpl oper) event to the event log 515*c*. An example of the contents of a seal device event log 515*c* after completion of the commit are shown in event log 515c: seal state locked and most recent event log listing complete operation.

At the completion of this successful two-phase commit process, the contents of the seal device event log 515c, representing the physical state of the seal, and the host event log 515b, representing the state of the seal in the host memory, are identical: both have a seal state of locked and a most recent log event of complete operation. Thus, the event logs are said to be in sync.

Figure 5B:
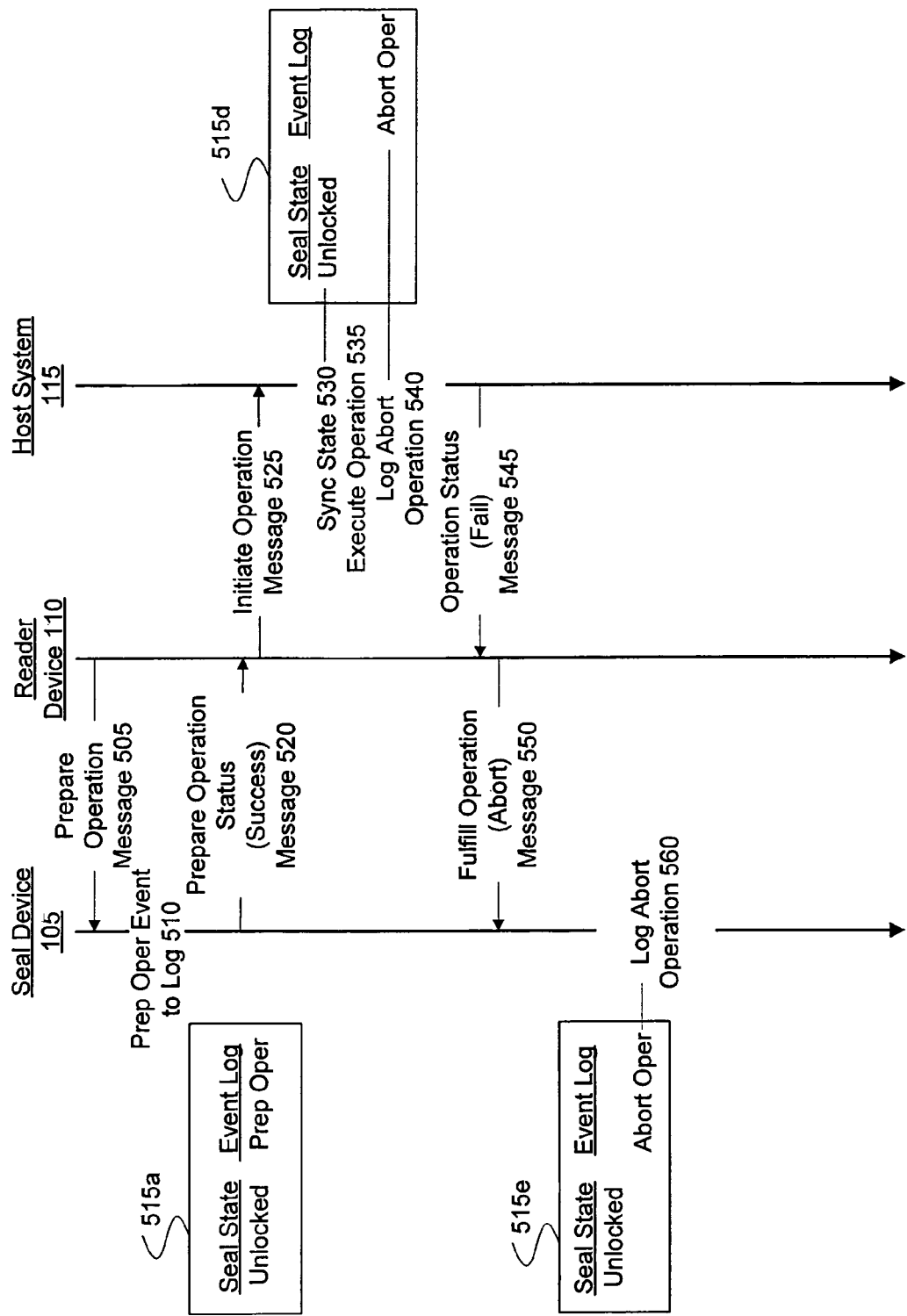
FIG. 5B is an interaction diagram illustrating a successful two-phase commit process for an aborted seal operation according to one embodiment of the present invention.

FIG. 5B is an interaction diagram illustrating a successful two-phase commit process for an aborted seal operation according to one embodiment of the present invention. The process begins similar to the completed seal operation depicted in FIG. 5A. A reader device 110 informs a seal device 105 that an operation is to be executed. The reader device 110 informs the seal device 105 of the operation that is to take place by, in response to receiving user input to initiate the operation, transmitting 505 a prepare operation message to the seal device 105. For example, if the operation to be performed is a lock operation, the prepare operation message would be a PrepareLock operation. Upon receiving the prepare operation message, the seal device 105 writes 510 a prepare operation event to an event log 515. An event log 515 includes seal state information and a record of events that take place at the seal device 105. An example of the contents of a seal device event log 515a for a lock operation at this point in the process is shown in event log 515a: seal state unlocked and event log prepare operation (prep oper). Once logged, the seal device 105 transmits 520 a prepare operation status message to the reader device 110. In this example, the status is successful. If for some reason the seal device 105 failed to receive the prepare operation message or write the prepare operation event to the log 515a, the prepare operation status message would be a fail message.

In response to receiving the (successful) prepare operation status message, the reader device 110 transmits 525 an initiate operation message to a host 115 ("host" herein). If the reader device 110 had instead received a failed prepare operation status message, the reader device 110 would not initiate the operation. In one embodiment, the initiate operation message includes various information about the seal device 105, such as authorization information and current seal state for the seal device. The host 115 then synchronizes 530 the seal state in its event log 515b, which usually is stored in a host database 405, with the seal state information received with the initiate operation message. As part of the synchronization process, the host 115 also may verify the authorization information received. An example of the contents of a host event log 515b at this point is shown in event log 515b aligned with synch step 530: seal state unlocked.

Next, the host 115 executes 535 the operation corresponding to the initiate operation message, in this example a lock operation. In this example the operation failed and the seal state remains unlocked. Then, the host 115 writes 540 an abort operation event to the event log 515d. An example of the contents of a host event log 515d at this point is shown in event log 515d aligned with the log 540 step: seal state unlocked and aborted operation (abort oper).

When the event is logged, the host 115 then transmits 545 an operation status message to the reader device 110, in this example a fail message. In response to receiving the operation status message, the reader device 110 in turn transmits 550 a fulfill operation (abort) message to the seal device 105. In this example, the fulfill operation message is an abort operation message, as the operation execution failed at the host 115 and the operation status message was a fail message. The commit operation message instructs the seal device 105 to abort the operation for which it has prepared. In response to receiving the abort operation message, the seal device 105 aborts the lock operation and writes 560 the abort operation (abort oper) event to the event log 515e. An example of the contents of a seal device event log 515e after completion of the abort are shown in event log 515e: seal state unlocked and most recent event log listing abort operation.

At the completion of this successful two-phase commit process, the contents of the seal device event log 515e, representing the physical state of the seal, and the host event log 515d, representing the state of the seal in the host memory, are identical: both have a seal state of unlocked and a most recent log event of abort operation. Thus, the event logs are said to be in sync.

An operation may be aborted as described above when the host 115 decides the operation should not execute for some reason. For example, the reader 110 may not have authorization to execute the requested operation, or if the host 1.15 determines that no changes should be made to the seal state, e.g., due to precious cargo. This aspect of the present invention demonstrates part of the rationale for the two-step process, to log every attempted operation, but to only fulfill an operation if the host 115 signals that the operation is authorized.

Figure 5C:
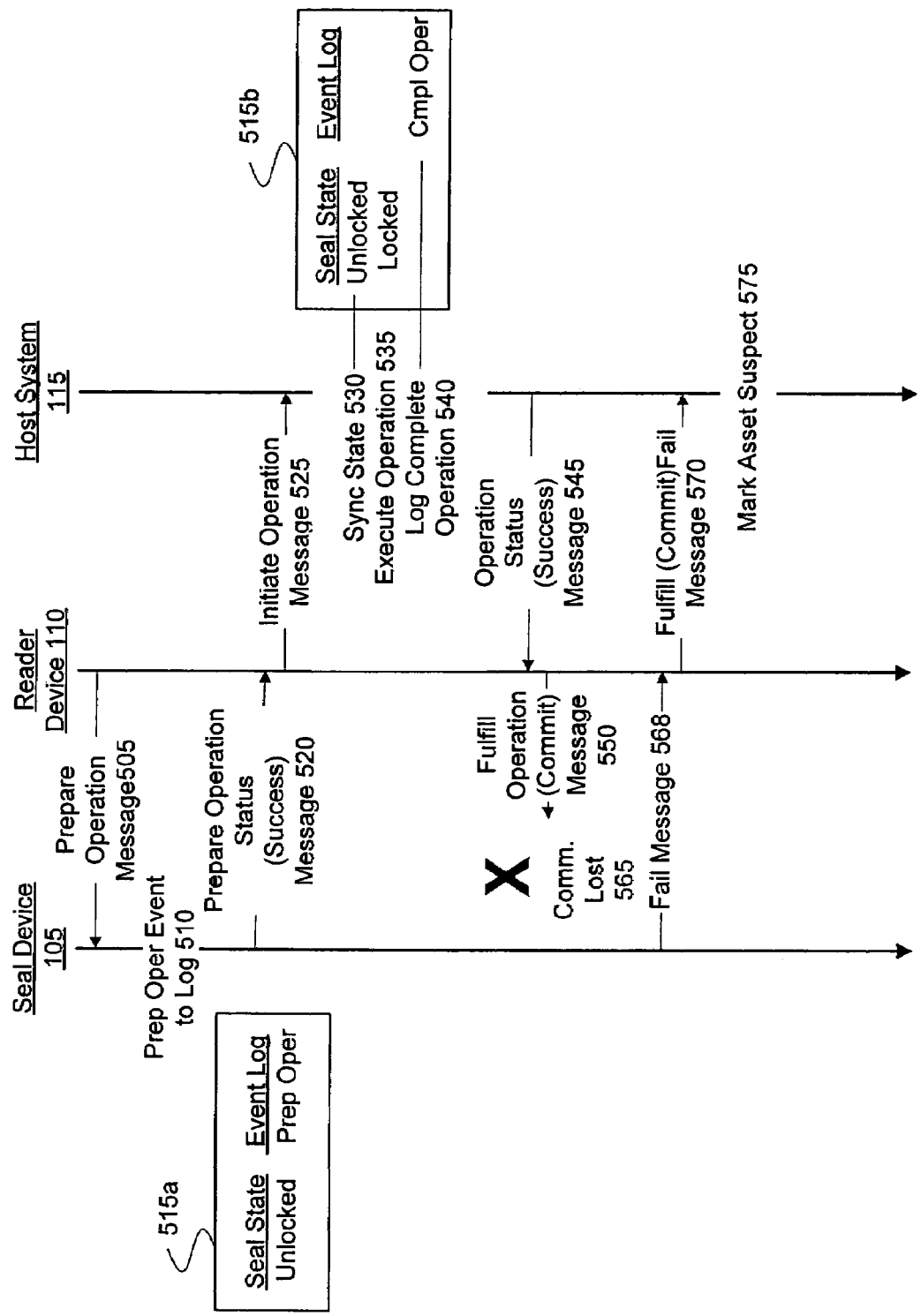
FIG. 5C is an interaction diagram illustrating a two-phase commit process with a communication failure between a reader device and a seal device according to one embodiment of the present invention.

FIG. 5C is an interaction diagram illustrating a two-phase commit process with a communication failure between a reader device 110 and a seal device 105 according to one embodiment of the present invention. The communication failure described below is during transmission of a fulfill operation message 550. For an example of a failure of communication between the reader device and seal device during transmission of a prepare status operation message 520, refer to the above description of FIG. 5A. The process begins similar to those described in FIGS. 5A and 5B. A reader device 110 informs a seal device 105 that an operation is to be executed. The reader device 110 informs the seal device 105 of the operation that is to take place by, in response to receiving user input to initiate the operation, transmitting 505 a prepare operation message to the seal device 105. For example, if the operation to be performed is a lock operation, the prepare operation message would be a PrepareLock operation. Upon receiving the prepare operation message, the seal device 105 writes 510 a prepare operation event to an event log 515. An event log 515 includes seal state information and a record of events that take place at the seal device 105. An example of the contents of a seal device event log 515a for a lock operation at this point in the process is shown in event log 515a: seal state unlocked and event log prepare operation (prep oper). Once logged, the seal device 105 transmits 520 a prepare operation status message to the reader device 110. In this example, the status is successful. If for some reason the seal device 105 failed to receive the prepare operation message or write the prepare operation event to the log 515a, the prepare operation status message would be a fail message.

In response to receiving the (successful) prepare operation status message, the reader device 110 transmits 525 an initiate operation message to a host 115. If the reader device 110 had instead received a failed prepare operation status message, the reader device 110 would not initiate the operation. In one embodiment, the initiate operation message includes various information about the seal device 105, such as authorization information and current seal state for the seal device. The host 115 then synchronizes 530 the seal state in its event log 515*b*, which usually is stored in a host database 405, with the seal state information received with the initiate operation message. As part of the synchronization process, the host 115 also may verify the authorization information received. An example of the contents of a host event log 515*b* at this point is shown in event log 515*b* aligned with synch step 530: seal state unlocked.

Next, the host 115 executes 535 the operation corresponding to the initiate operation message, in this example a lock operation. In this example the operation was successful and the seal state is now locked. Then, the host 115 writes 540 a complete operation event to the event log 515*b*. An example of the contents of a host event log 515*b* at this point is shown in event log 515*b* aligned with the log 540 step: seal state locked and complete operation (cmpl oper).

When the event is complete and logged, the host 115 then transmits 545 an operation status message to the reader device 110, in this example a success message. In response to receiving the operation status message, the reader device 110 in turn transmits 550 a fulfill operation message to the seal device 105. In this example, the fulfill operation message is a commit operation message, as the operation execution was successful at the host 115 and the operation status message was a success message. However, the fulfill operation message transmitted 550 by the reader device 110 is never received by the seal device 105 due to a loss of communication 565 between the reader device 110 and seal device 105. Alternatively, the seal device 105 may send a fail message 568 to the reader device 110. After a predetermined timeout period during which the seal device 105 does not fulfill the transaction, the reader device 110 transmits 570 a fulfill (commit) fail message to the host 115, indicating that the operation was not fulfilled by the seal device 105. The host 115 then marks 575 the asset associated with the seal device 105 as suspect.

At the completion of this failed two-phase commit process, the contents of the seal device event log 515*a*, representing the physical state of the seal, and the host event log 515*b*, representing the state of the seal in the host memory, different. The seal device 105 has a seal state of locked and a most recent log event of prepare operation (prep oper) and the host 115 has a seal state of locked and a most recent log event of complete operation (cmpl oper). Thus, the event logs are said to be out of sync.

Figure 5D:
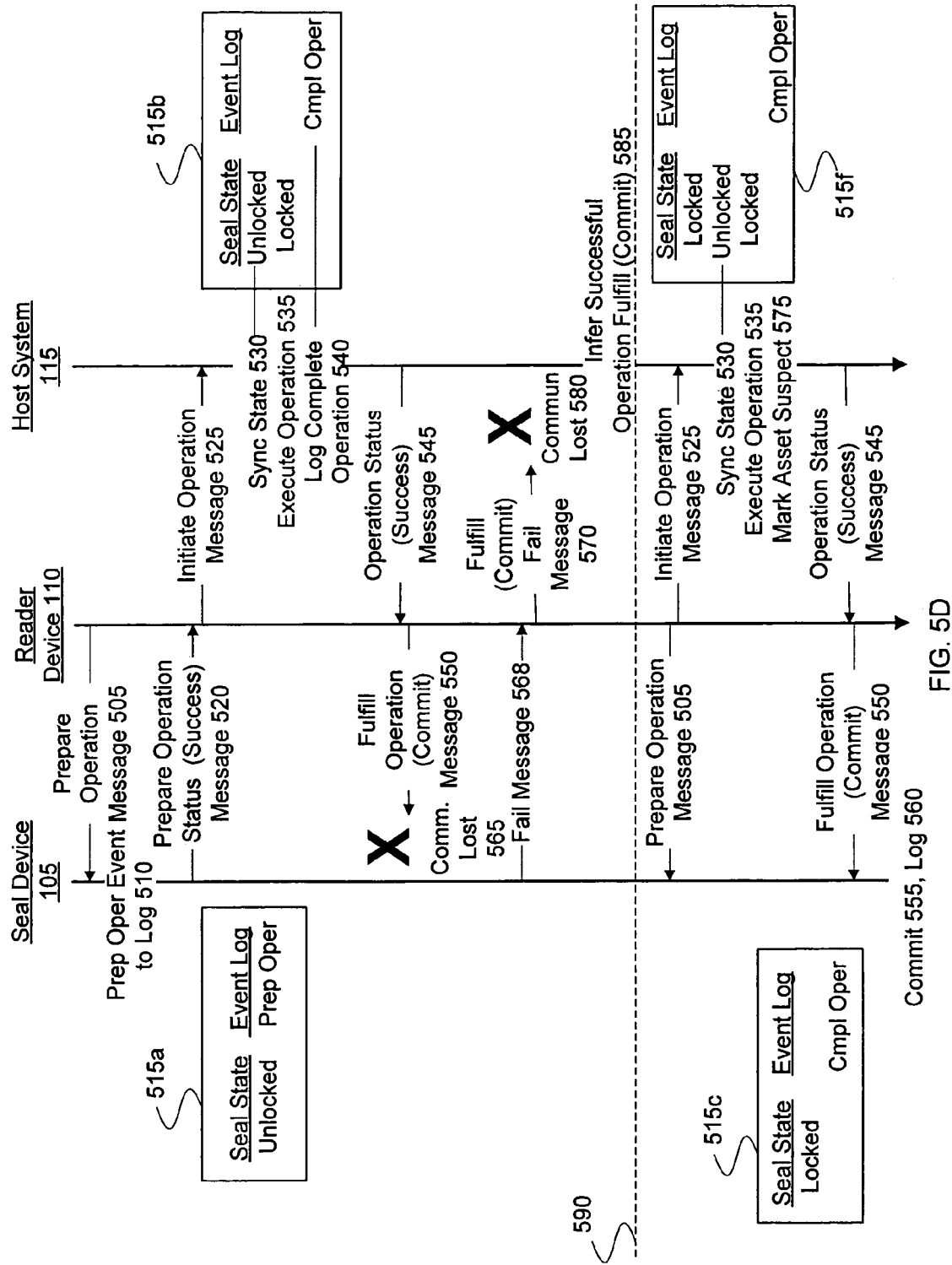
FIG. 5D is an interaction diagram illustrating a two-phase commit process with a communication failure between a reader device and a seal device and the seal device and a host according to one embodiment of the present invention.

FIG. 5D is an interaction diagram illustrating a two-phase commit process with a communication failure between a reader device 110 and a seal device 105 and the seal device 105 and a host 115 according to one embodiment of the present invention. The process is identical to that described in conjunction with FIG. 5C up to step 570, in which the reader device transmits a fulfill fail message to the host 115. However, in this scenario, the host 115 does not receive the message due to a loss of communication 580 between the reader device 110 and the host 115. Because no fulfill fail message is received by the host 115, the host 115 infers 585 that the operation fulfill (commit) was successful. The host 115 is configured to make such an inference by the status module 435 of the host software 415, as described above in conjunction with FIG. 4B. However, as described in conjunction with FIG. 5C, the event logs of the seal device 105 and host 115 are out of sync.

At some point communication between the various entities is restored 590 (which the reader device 110 can detect), at which time the system retries the operation, beginning again with the reader device 110 transmitting 505 a prepare operation message to the seal device 105. Again this manifests in the reader device 110 transmitting 525 an initiate operation message to the host 115. Upon the host 115 receiving the initiate operation message, the host 115 synchronizes 530 its stored seal state with the actual seal state information received in the initiate operation message. At this point, because the event logs are out of sync, the host 115 notices the disparity. The seal state in the seal device event log 515*a* is unlocked, but the seal state in its own event log 515*f* is locked (from 515*b*). Thus, the host 115 recognizes that the seal 105 may be trying to redo an operation. It executes 535 the operation, but may mark 575 the asset as suspect. In short, a communication failure anywhere affecting the Operation Status 545 or Fulfill Operation Messages 550 causes the reader 110 to retry the operation.

An example of the contents of a host event log 515*f* at this point is shown in event log 515*f*: seal state locked and complete operation (cmpl oper). The process then continues as described above in conjunction with the successful two-phase commit process of FIG. 5A. The host 115 transmits 545 an operation status message to the reader device 110, in this example a success message. In response to receiving the operation status message, the reader device 110 in turn transmits 550 a fulfill operation message to the seal device 105. In this example, the fulfill operation message is a commit operation message, as the operation execution was successful at the host 115 and the operation status message was a success message. The commit operation message instructs the seal device 105 to commit the operation for which it has prepared. In response to receiving the commit operation message, the seal device 105 commits 555 the lock operation and writes 560 the complete operation (cmpl oper) event to the event log 515*c*. An example of the contents of a seal device event log 515*c* after completion of the commit are shown in event log 515*c*: seal state locked and most recent event log listing complete operation.

At the completion of this successful two-phase commit process, the contents of the seal device event log 515*c*, representing the physical state of the seal, and the host event log 515*f*, representing the state of the seal in the host memory, are identical: both have a seal state of locked and a most recent log event of complete operation. Thus, the event logs now are in sync.

Figure 5E:
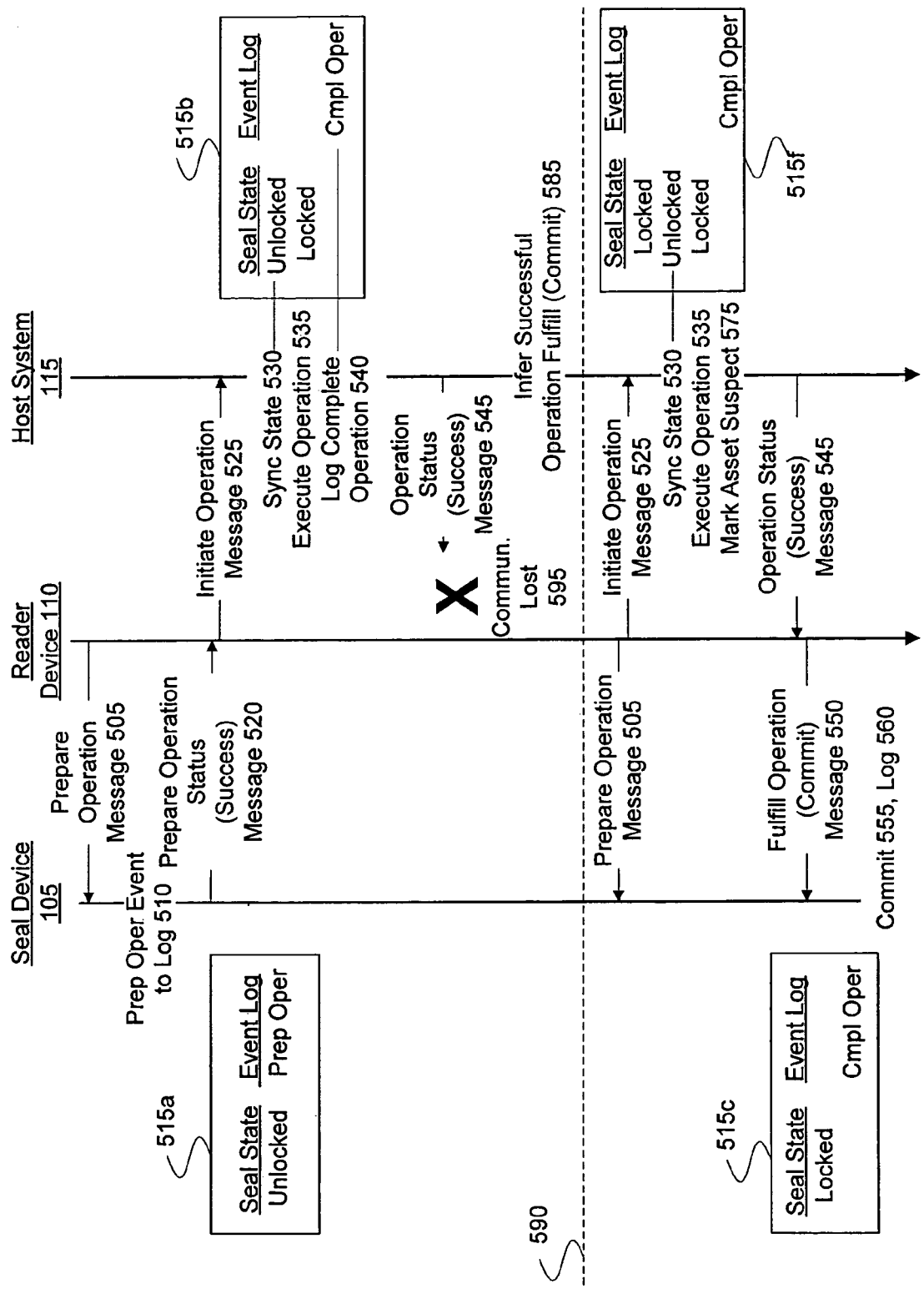
FIG. 5E is an interaction diagram illustrating a two-phase commit process with a communication failure between a reader device and a host according to one embodiment of the present invention.

FIG. 5E is an interaction diagram illustrating a two-phase commit process with a communication failure between a reader device 110 and a host 115 according to one embodiment of the present invention. The process is identical to that described in conjunction with FIG. 5A up to step 545, in which the host 115 transmits 545 an operation status (success) message to the reader device 110. In this example, the operation status message does not reach the reader device 110 because of a loss of communication 595 between the host 115 and reader device 110. Similar to the process of FIG. 5D, the host 115 infers 585 that the operation fulfill (commit) was successful.

At some point communication between the various entities is restored 590, at which time the system retries the operation as described in conjunction with FIG. 5D. Similarly, when the host 115 synchronizes 530 the seal states, it finds a disparity due to the logs being out of sync. At this point, the host 115 recognizes that the seal 105 may be trying to redo an operation. Thus, it executes 535 the operation, but may mark 575 the asset as suspect. Then, as above the seal device 105 commits 555 the operation and writes 560 the event to the log. An example of the contents of a seal device event log 515*c* after completion of the commit are shown in event log 515*c*: seal state locked and most recent event log listing complete operation.

At the completion of this successful two-phase commit process, the contents of the seal device event log 515*c*, representing the physical state of the seal, and the host event log 515*f*, representing the state of the seal in the host memory, are identical: both have a seal state of locked and a most recent log event of complete operation. Thus, the event logs now are in sync.

The above process of irreversible logging of events enables the system, working in conjunction with the hardware entities, to provide vastly increased security against tampered containers. The use of these protocols and commands enhances system performance and efficiency. Although the processes performed by the reader device 110 and host system 115 are described as taking place between these two separate entities, in one embodiment they are executed by a single reader/host device (110 in combination with 115) in communication with a seal device 105.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method of two-phase transaction commit processing in a conveyance tracking system using a reader device for synchronizing seal state information between a seal device attached to a conveyance and a host for tracking conveyances, the method executed by the seal device, the method comprising:
   in response to receiving a prepare operation message from the reader device, entering a prepared state for a seal operation;
   communicating seal device preparation status via the reader device to the host, causing the host to execute the seal operation;
   in response to receiving a seal operation execution message from the host via the reader device, fulfilling the seal operation and storing associated seal state information.

2. The method of claim 1, further comprising in response to a loss of communication with the seal device, causing the host to mark as suspect the conveyance attached to the seal device.

3. The method of claim 1, wherein fulfilling the seal operation places the seal device into a locked state.

4. The method of claim 3, wherein the seal device goes into a tamper state if a seal sensor detects that a lock on the conveyance has been physically removed.

5. The method of claim 1, wherein the seal device physically prevents the conveyance from opening when the seal device is in a locked state.

6. A method of two-phase transaction commit processing in a conveyance tracking system using a reader device for synchronizing seal state information between a seal device attached to a conveyance and a host for tracking conveyances, the method executed by the reader device, the method comprising:
   in response to receiving user input to initiate a seal operation, transmitting a prepare operation message to the seal device to place the seal device in a prepared state for the seal operation;
   in response to receiving a prepare operation status message from the seal device, transmitting an initiate operation message from the reader device to the host to cause the host to execute the seal operation; and
   in response to receiving an operation status message from the host, transmitting a fulfill operation message to the seal device to cause the seal device to fulfill the seal operation.

7. A method of two-phase transaction commit processing in a conveyance tracking system, using a reader device, for synchronizing seal state information between a seal device attached to a conveyance and a host for tracking conveyances, the method executed by the host, the method comprising:
   in response to receiving an initiate operation message from the reader device indicating that the seal device has been placed in a prepared state for a seal operation, synchronizing seal state information with a seal device seal state;
   executing the seal operation;
   writing a complete operation event to an event log;
   transmitting an operation status to the reader device; and
   transmitting a fulfill operation message via the reader device to the seal device to cause the seal device to fulfill the seal operation.

8. The method of claim 1, 6, or 7 wherein the seal operation is one from the group consisting of a lock operation, an unlock operation, and a clear tamper operation.

9. The method of claim 1, 6, or 7, wherein seal operation execution is successful and fulfilling the seal operation commits the operation.

10. The method of claim 1, 6, or 7, wherein seal operation execution fails and fulfilling the seal operation aborts the operation.

11. The method of claim 6, wherein the prepare operation status message includes authorization and seal state information.

12. The method of claim 6, further comprising, in response to a loss of communication with the seal device, transmitting a fulfill fail message to the host to cause the host to mark as suspect the conveyance attached to the seal device.

13. The method of claim 6, wherein the initiate operation message includes authorization and seal state information.

14. A computer program product for two-phase transaction commit processing in a conveyance tracking system using a reader device for synchronizing seal state information between a seal device attached to a conveyance and a host for tracking conveyances, comprising:
   a computer-readable medium for controlling the seal device; and
   computer program code, coded on the medium, for:
   entering a prepared state for a seal operation in response to receiving a prepare operation message from the reader device;
   communicating seal device preparation status via the reader device to the host, causing the host to execute the seal operation; and
   fulfilling the seal operation in response to receiving a seal operation execution message from the host via the reader device.

15. The computer program product of claim 14, the computer program code further coded for, in response to a loss of communication with the seal device, causing the host to mark as suspect the conveyance attached to the seal device.

16. A computer program product for two-phase transaction commit processing in a conveyance tracking system using a reader device for synchronizing seal state information between a seal device attached to a conveyance and a host for tracking conveyances, comprising:

a computer-readable medium for controlling the reader device; and computer program code, coded on the medium, for:

in response to receiving user input to initiate a seal operation, transmitting a prepare operation message to the seal device to place the seal device in a prepared state for the seal operation;

in response to receiving a prepare operation status message from the seal device, transmitting an initiate operation message from the reader device to the host to cause the host to execute the seal operation; and in response to receiving an operation status message from the host, transmitting a fulfill operation message to the seal device to cause the seal device to fulfill the seal operation.

17. A computer program product for two-phase transaction commit processing in a conveyance tracking system, using a reader device for synchronizing seal state information between a seal device attached to a conveyance and a host for tracking conveyances, comprising:

a computer-readable medium for controlling the host device; and computer program code, coded on the medium, for:

in response to receiving an initiate operation message from the reader device indicating that the seal device has been placed in a prepared state for a seal operation, synchronizing seal state information with a seal device seal state;

executing the seal operation;

writing a complete operation event to an event log;

transmitting an operation status to the reader device; and transmitting a fulfill operation message via the reader device to the seal device to cause the seal device to fulfill the seal operation.

18. The computer program product of claim 14, 16, or 17 wherein the seal operation is one from the group consisting of a lock operation, an unlock operation, and a clear tamper operation.

19. The computer program product of claim 14, 16, or 17, wherein seal operation execution is successful and fulfilling the seal operation commits the operation.

20. The computer program product of claim 14, 16, or 17, wherein seal operation execution fails and fulfilling the seal operation aborts the operation.

21. The computer program product of claim 16, wherein the prepare operation status message includes authorization and seal state information.

22. The computer program product of claim 16, the computer program code further coded for, in response to a loss of communication with the seal device, transmitting a fulfill fail message to the host to cause the host to mark as suspect the conveyance attached to the seal device.

23. The computer program product of claim 16, wherein the initiate operation message includes authorization and seal state information.

24. A system for synchronizing seal state information in a conveyance tracking system using two-phase transaction commit processing, comprising:

a host communicatively coupled to a reader device and comprising a module to execute a seal operation;

a seal device communicatively coupled to the reader device and comprising a first module to initially enter a prepared state for the seal operation and a second module to fulfill the seal operation;

the reader device communicatively coupled to the host and the seal device and comprising transceivers to transmit and receive operation messages between the host and the seal device; and wherein said seal device initially enters the prepared state responsive to a prepare operation message from the reader device, and fulfills the seal operation responsive to a fulfill operation message from the host via the reader device.

25. The system of claim 24, wherein the reader device is further comprises a module to detect a loss of communication between the seal device and the host.

26. The system of claim 24, wherein the host and the reader device communicate via IEEE standard 802.11 protocol.

27. The system of claim 24, wherein the seal device and the reader device communicate via ultra high frequency range signals.

28. The system of claim 27, wherein the ultra high frequency range signals are at a frequency of 433 MHz.

29. The system of claim 27, wherein the ultra high frequency range signals are at a frequency of 900 MHz.

30. The system of claim 24, wherein the second module to fulfill the seal operation places the seal device into a locked state.

31. The system of claim 30, wherein the seal device goes into a tamper state if a seal sensor detects that a lock on the conveyance has been physically removed.

32. The system of claim 24, wherein the seal device physically prevents the conveyance from opening when the seal device is in a locked state.

33. A reader device for two-phase transaction commit processing in a conveyance tracking system for synchronizing seal state information between a seal device attached to a conveyance and a host for tracking conveyances, in which the seal device initially enters a prepared state for, and later fulfills, a seal operation, the reader device comprising:

a processing unit for controlling and executing reader device operations, comprising software for initiating operations and orchestrating communication between the seal device and the host, comprising:

an initiation module for initiating seal device operations in response to user input; and a communications module for initiating transmission and reception of messages to and from the seal device and the host;

a seal transceiver communicatively coupled to the processing unit for transmitting a prepare operation message to cause the seal device to enter the prepared state, transmitting a fulfill operation message to the seal device to cause it to fulfill the seal operation in response to receiving an operation status message from the host, and receiving a prepare operation status message from the seal device;

a host transceiver communicatively coupled to the processing unit for transmitting an initiate operation message to cause the host to execute the seal operation in response to the prepare operation status message, and receiving the operation status message from the host; and a memory communicatively coupled to the processing unit for storing data.

34. The reader device of claim 33, further comprising:

a display communicatively coupled to the processing unit for displaying visual information regarding the functioning of the reader device or any input received; and an input for communicatively coupled to the processing unit to allow a user of the reader device to input commands.

35. The reader device of claim 33, the processing unit further comprising:
   a communication loss module for detecting losses of communication in the conveyance tracking system; and
   a signal processing module processing signals sent to and received from the seal device.

36. The reader device of claim 33, wherein the reader device is handheld.

37. The reader device of claim 33, wherein the reader device is stationary.

38. A method of two-phase transaction commit processing in a conveyance tracking system using a reader device for synchronizing seal state information in a seal device attached to a conveyance with seal state information stored by a host for tracking conveyances, the method executed by the seal device, the method comprising:
   in response to receiving a prepare operation message from the reader device, writing a prepare operation event to an event log and transmitting a prepare operation status message to the reader device; and
   in response to receiving a fulfill operation message from the reader device indicating an execute seal operation by the host, fulfilling the operation and writing a fulfill event to the event log, wherein the host executes the seal operation in response to the reader device communicating to the host its receipt of the prepare operation status message.

39. The method of claim 38, wherein the operation is one from the group consisting of a lock operation, an unlock operation, and a clear tamper operation.

40. The method of claim 38, wherein the prepare operation status message includes authorization and seal state information about the seal device.

41. The method of claim 38, wherein fulfilling the operation commits the operation.

42. The method of claim 38, wherein fulfilling the operation aborts the operation.

43. The method of claim 38, fulfilling the operation places the seal device into a locked state.

44. The method of claim 43, wherein the seal device goes into a tamper state if a seal sensor detects that a lock on the conveyance has been physically removed.

45. The method of claim 38, wherein the seal device physically prevents the conveyance from opening when the seal device is in a locked state.

46. A method of two-phase transaction commit processing in a conveyance tracking system using a reader device for synchronizing seal state information stored in a host for tracking conveyances with seal state information in a seal device attached to a conveyance, the method executed by the host, the method comprising:
   in response to receiving an initiate operation message from the reader device, synchronizing seal state information stored in an event log to correspond with a seal device seal state using information sent from the seal device via the reader device;
   executing a seal operation corresponding to the initiate operation message;
   writing a complete operation event to the event log; and
   transmitting an operation status message to the reader device so that the reader device can transmit a fulfill operation message to the seal device to fulfill the seal operation.

47. The method of claim 46, further comprising inferring a successful operation fulfill.

48. The method of claim 46, further comprising, in response to receiving a fulfill fail message, marking as suspect a conveyance corresponding to the seal device.

49. The method of claim 46, further comprising, in response to discovering a discrepancy between seal state information upon synchronization, marking as suspect a conveyance corresponding to the seal device.

50. The method of claim 46, wherein the operation is one from the group consisting of a lock operation, an unlock operation, and a clear tamper operation.

* * * * *

UNITED STATES PATENT AND TRADEMARK OFFICE
CERTIFICATE OF CORRECTION

PATENT NO. : 7,358,856 B2 Page 1 of 1
APPLICATION NO. : 11/084126
DATED : April 15, 2008
INVENTOR(S) : Ravindra U. Rajapakse et al.

It is certified that error appears in the above-identified patent and that said Letters Patent is hereby corrected as shown below:

Title Page (56) Other Publications, Line 3
Please delete "PCT/US04/14208" and insert --PCT/US04/14206--

Signed and Sealed this

Fifth Day of August, 2008

JON W. DUDAS
*Director of the United States Patent and Trademark Office*